US006570142B1

(12) United States Patent
Kawanami et al.

(10) Patent No.: US 6,570,142 B1
(45) Date of Patent: May 27, 2003

(54) OPTICAL APPARATUS WITH A CONTROL DEVICE FOR A MOVING MEMBER USING POSITION INFORMATION

(75) Inventors: Akihiro Kawanami, Tokyo (JP); Junichi Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/489,705

(22) Filed: Jan. 24, 2000

(30) Foreign Application Priority Data

Jan. 29, 1999 (JP) .......................................... 11-020871
Jan. 20, 2000 (JP) ....................................... 2000-012083

(51) Int. Cl.[7] ...................... G02B 27/40; G02B 27/64; G02B 7/04
(52) U.S. Cl. ..................................... 250/201.2; 396/72
(58) Field of Search ........................ 250/201.2, 201.4, 250/204; 396/85, 86, 72, 79

(56) References Cited

U.S. PATENT DOCUMENTS 5,748,997 A * 5/1998 Tabata et al. .................. 396/87
5,930,054 A * 7/1999 Kasuya ........................ 359/698
6,144,021 A * 11/2000 Suzuki ...................... 250/201.2

* cited by examiner

Primary Examiner—Stephone B. Allen
Assistant Examiner—Eric Spears
(74) Attorney, Agent, or Firm—Robin, Blecker & Daley

(57) ABSTRACT

A position control device arranged to store a stop position of a movable lens member and, after the lens member is moved from the stop position to an arbitrary position, to automatically move the lens member to the stored stop position includes a first encoder which divides a movable range of the lens member into a plurality of areas and detects one of the areas in which the stored stop position is located and a second encoder which outputs pulses according to the movement of the lens member at a finer rate of resolution than the resolution of the first encoder. In the position control device, information on the area detected by the first encoder and the number of pulses detected by the second encoder as a position within the detected area is stored as the information on the stored stop position. The position control device compares the output of the first encoder and that of the second encoder with the stored information in moving the lens member to the stored stop position.

20 Claims, 12 Drawing Sheets

FIG. 1
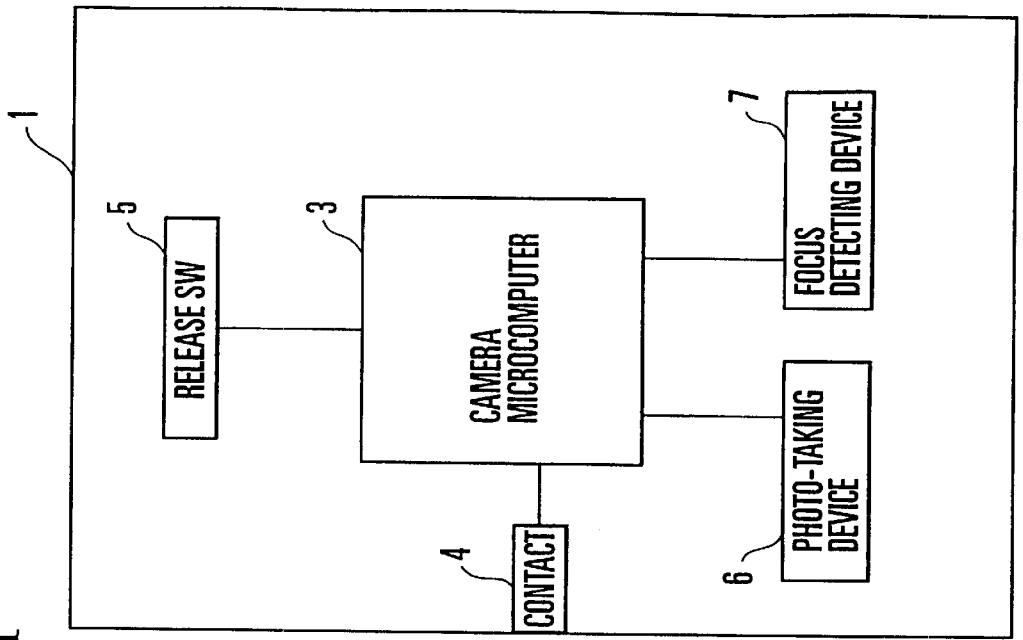
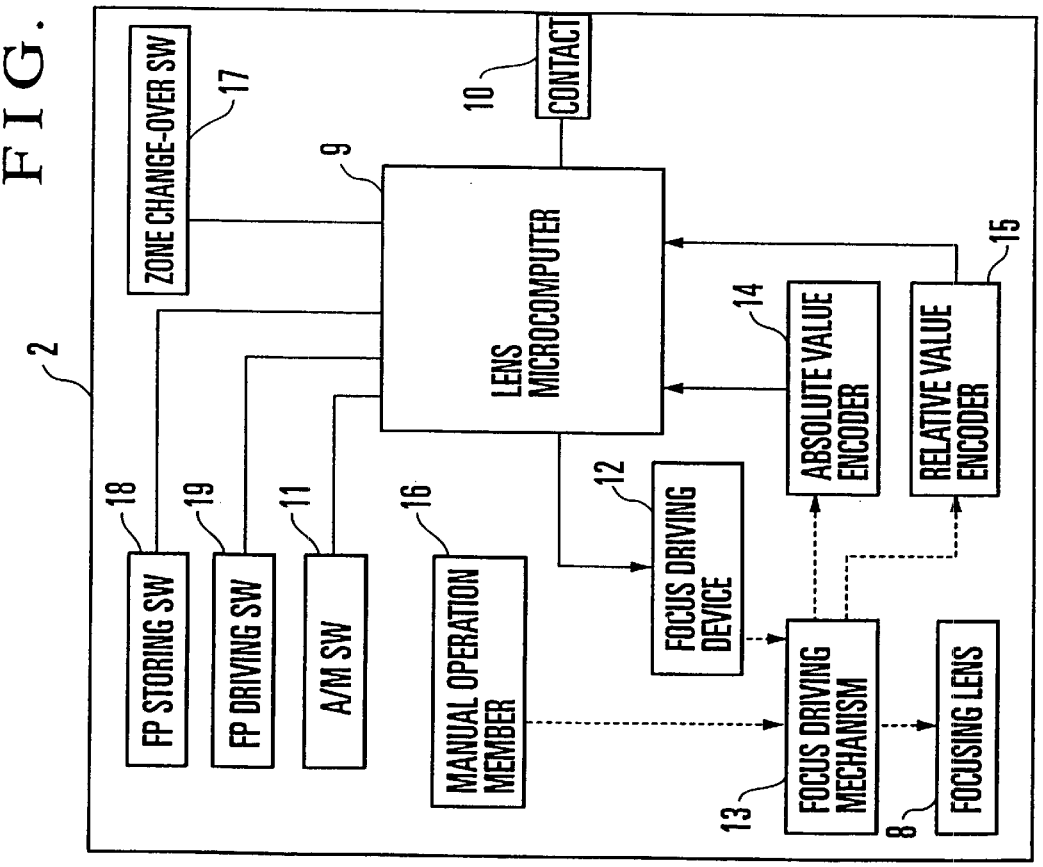

OPTICAL APPARATUS WITH A CONTROL DEVICE FOR A MOVING MEMBER USING POSITION INFORMATION

BACKGROUND OF THE INVENTION

1. Field of the Invention

The present invention relates to a lens position control device and an optical apparatus having a full-time manual operating function whereby a lens can be moved in the direction of an optical axis through a mechanical cam or the like interlocked with a ring operation member and a focus preset function whereby the lens can be instantly driven and moved to a preset position.

2. Description of Related Art

It is known that some optical apparatuses have a focus preset (hereinafter abbreviated FP) function. For the FP function, an FP storing switch and an FP driving switch are provided on an interchangeable lens. With the FP storing switch operated at a desired focusing lens position beforehand, a focusing lens can be instantly moved to the desired position with a motor by just operating the FP driving switch, even after the focusing lens is driven with the motor by an automatic focusing (AF) action or by a manual focusing (MF) action performed according to the result of focus detection on the basis of an output of an AF sensor or according to the amount of operation on a manual operation ring. This FP function enables the user of the optical apparatus such as a camera, to carry out a photo-taking operation without delay in a case where shooting operation must be instantly be carried out.

Known optical apparatuses of the kind having the FP function include some of automatic focusing single-lens reflex cameras. The automatic focusing single-lens reflex cameras having the FP function must be arranged to electrically operate focusing lenses with motors.

FIG. 12 is a block diagram showing by way of example an interchangeable lens to be used by an automatic focusing single-lens reflex camera of the kind having the FP function. In FIG. 12, full lines indicate electrical connection and broken lines indicate mechanical connection.

Referring to FIG. 12, a lens microcomputer 102 is arranged at a lens body 101 to control various devices within the lens body 101 and to conduct communication with a camera body (not shown) through a contact part 103.

An automatic/manual change-over (A/M) switch 104 is arranged to permit selection of an AF mode and an MF mode. In the AF mode, a result of focus detection made by a focusing detecting device (not shown) is transferred to the lens microcomputer 102 from the camera body. Then, in accordance with the result of focus detection, the lens microcomputer 102 causes a focus driving device 105 which is a drive source to act. The driving force of the focus driving device 105 is transmitted to a focus driving mechanism 106 which is a driving force transmission mechanism. The focus driving mechanism 106 then drives a focusing lens 107 accordingly.

An absolute value encoder 108 and a relative value encoder 109 are arranged to send their detection signals to the lens microcomputer 102. The absolute value encoder 108 is disposed at a part of a transmission mechanism of the focus driving mechanism 106 and is formed, for example, to have a fixed Gray code pattern (not shown) and electric contacts (not shown) opposed to the Gray code pattern. The absolute value encoder 108 is thus arranged to detect the absolute position of the focusing lens 107 by detecting the state of the Gray code pattern through the electric contacts.

The relative value encoder 109 is disposed at a part of the transmission mechanism of the focus driving mechanism 106 and is formed, for example, with a fixed photo-interrupter (not shown) and a pulse plate which is arranged between the light-emitting and light-receiving parts of the photo-interrupter to transmit and block light. The relative value encoder 109 is thus arranged to detect the relative position of the focusing lens 107 by outputting a pulse signal which turns on and off accordingly as the focusing lens 107 moves and by counting the number of pulses of the pulse signal.

The resolution of the absolute value encoder 108 is obtained by dividing the maximum moving stroke of the focusing lens 107, for example, into 32 parts (5 bits). The resolution of the absolute value encoder 108 is thus arranged to limit the movable range of the focusing lens 107. The relative value encoder 109 is arranged to have a resolution which is at least equal to a degree of stopping precision required in bringing the focusing lens 107 to a stop and which satisfies a required rate of focusing accuracy determined according to the F-number and the focal length.

The lens microcomputer 102 controls the focus driving device 105 according to input of information. The lens microcomputer 102 stops the focus driving device 105 when a required amount of moving the focusing lens 107 decided according to the result of focus detection made by the focus detecting device (not shown) and an actual moving amount of the focusing lens 107 detected by the relative value encoder 109 eventually have coincided with each other.

In the MF mode, focus is not adjusted on the basis of the result of the above-stated focus detection. In the MF mode, focus is manually adjusted by operating the manual operation member 110 from outside. The manual operation member 110 is arranged to send, when it is operated, a signal to the lens microcomputer 102 according to the amount and speed of the operation.

Then, in accordance with the signal, the lens microcomputer 102 starts the focus driving device 105 while monitoring the output of the relative value encoder 109, so as to cause the focus driving mechanism 106 to move the focusing lens 107. Therefore, in the MF mode, the user of the camera can move the focusing lens 107 by operating the manual operation member 110 to an extent considered to be apposite to conditions under which the camera is operated.

A zone change-over switch 111 is arranged to permit selection and change-over of the movable range of the focusing lens 107 in the AF or MF mode by operating it from outside. More specifically, the normal movable range of the focusing lens 107 can be selected by turning the zone change-over switch 111 off, while a narrower limited range can be selected by turning the zone change-over switch 111 on. Information on the result of selection of the focusing lens movable range is sent from the zone change-over switch 111 to the lens microcomputer 102. In accordance with the output of the zone change-over switch 111, if the zone change-over switch 111 is turned on in the AF or MF mode, the lens microcomputer 102 controls the focus driving device 105 while monitoring the output of the absolute value encoder 108, in such a way as to inhibit the focusing lens 107 from being driven to the outside of the selected range.

Switches 112 and 113 are provided for the focus preset (FP) function. Both the FP storing switch 112 and the FP driving switch 113 are arranged to be operable from outside and to send their outputs to the lens microcomputer 102. The FP function is carried out as follows.

When the FP storing switch 112 is operated, the lens microcomputer 102 resets a first counter disposed therein to "0". After that, when the focusing lens 107 is to be moved by the AF or MF action, the count value of the first counter is either incremented or decremented by one according to the moving direction of the focusing lens 107, i.e., toward its nearest-distance-end position or toward its infinity-distance-end position according to changes taking place in the output of the relative value encoder 109.

After that, when the FP driving switch 113 is operated, the lens microcomputer 102 causes the focus driving device 105 to drive the focusing lens 107 in the direction of causing the count value of the first counter to become "0". When the count value of the first counter has become "0", the lens microcomputer 102 stops the focus driving device 105. The two FP switches 112 and 113, therefore, enable the user to have the focusing lens 107 promptly moved to a desired position by operating them.

The automatic focusing single-lens reflex camera of the kind having the focus preset (FP) function is arranged as described above.

The lens microcomputer 102 which is disposed within the interchangeable lens of the automatic focusing single-lens reflex camera is arranged to control a diaphragm (not shown) besides the focusing lens. In addition, upon completion of control actions, the action ending signal is sent from the camera body to the lens microcomputer 102, and, then, the lens microcomputer 102 shifts its operation mode to a low power consumption mode for the purpose of power saving. In the low power consumption mode, currents applied to the focus driving device 105, a diaphragm driving device (not shown), etc., are cut off. The lens microcomputer 102 then waits for receiving a lens operating signal from the camera body, detection of operations on the manual operation member and information on the states of switches provided on the interchangeable lens. Upon receipt of the signal or upon detection of the switch operation, the lens microcomputer 102 shifts from the low power consumption mode back to the normal operation mode.

As mentioned in the description of the focus preset (FP) function above, even if the focusing lens 102 is driven by the AF or MF actions after the FP storing switch 112 is operated at a desired focusing lens position, the amount of driving the focusing lens 107 must be continuously monitored after the operation of the FP storing switch 112 in order to have the focusing lens 107 instantly moved to the desired position with the motor by operating the FP driving switch 113.

This process is necessary even in a case where the MF action is performed by a manual operation while the lens microcomputer 102 is in the above-stated low power consumption mode. To meet this requirement, the automatic focusing single-lens reflex camera having the focus preset (FP) function must be arranged to carry out the following sequence of actions.

First step: When the manual operation member 110 is operated by the user, a signal indicative of the amount and speed of the operation is supplied to the lens microcomputer 102.

Second step: Upon receipt of the manual operation signal, the lens microcomputer 102 returns from the low power consumption mode to the normal operation mode.

Third step: Then, the lens microcomputer 102 sends information on the amount and speed of the manual operation to the camera body. After that, an instruction is sent from the camera body to the lens microcomputer 102, instructing the lens microcomputer 102 to drive the focusing lens 107 with information on a focusing lens driving amount.

Fourth step: In accordance with the instruction, the lens microcomputer 102, while monitoring the relative value encoder 109, causes the focus driving device 105 to have the focusing lens 107 moved through the focus driving mechanism 106.

As mentioned above, the camera or optical apparatus must be arranged to only electrically drive the focusing lens with a motor in order to carry out the focus preset function.

However, in a case where an optical apparatus is arranged to have both a full-time manual operating function whereby the lens is to be moved in the direction of an optical axis through a cam member interlocked with a manual operation member and the focus preset function, there arises a problem as follows.

In a case where a manual focusing (MF) operation is performed while the lens microcomputer 102 is in the above-stated low power consumption mode, the focusing lens moves to some extent in association with the manual operation member before the lens microcomputer returns to its normal operation mode. The lens microcomputer 102, therefore, cannot accurately monitor the focusing lens driving amount. If the FP driving switch is operated after that, the focusing lens position obtained by operating the FP driving switch deviates from a desired focusing lens position set by operating the FP storing switch.

It is conceivable that this problem can be solved by arranging the absolute value encoder to have the same resolution as the resolution of the relative value encoder. However, that arrangement is undesirable as it necessitates use of such an encoder that is much more expensive than the absolute value encoder.

BRIEF SUMMARY OF THE INVENTION

It is an object of the invention to provide a position control device arranged to solve the above-stated problem of the prior art, although the position control device uses a relative value encoder and an absolute value encoder which is more coarse in resolution than the relative value encoder without recourse to use of any expensive encoder.

To attain the above object, in accordance with an aspect of the invention, there is provided a position control device arranged to store, as a target position, a position at which a moving member is stopped and to move the moving member to the target position from a position other than the target position, the position control device comprising a first detecting circuit which divides a movable range of the moving member into a plurality of areas and detects in which area of the plurality of areas the moving member is located, a second detecting circuit which detects an amount of movement of the moving member, a storage circuit which stores information specifying a target area in which the target position exists among the plurality of areas and indicating a position where the target position is located within the target area, and a control circuit which controls, in moving the moving member to the target position from a position other than the target position, movement of the moving member on the basis of results of detection made by the first detecting circuit and the second detecting circuit and the information stored in the storage circuit.

In accordance with another aspect of the invention, there is provided a position control device arranged to store a target position for a moving member and to move the moving member to the target position from a position other than the target position, the position control device comprising a first detecting circuit which divides a movable range of the moving member into a plurality of areas and detects in which area of the plurality of areas the moving member is located, a second detecting circuit which detects an amount of movement of the moving member, a storage circuit which stores information specifying a target area in which the target position exists among the plurality of areas and indicating a position where the target position is located within the target area, and a control circuit which controls, in moving the moving member to the target position from a position other than the target position, movement of the moving member on the basis of results of detection made by the first detecting circuit and the second detecting circuit and the information stored in the storage circuit.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 1 is a block diagram showing the arrangement of an automatic focusing type camera to which the invention is applied.

DETAILED DESCRIPTION OF THE INVENTION

Hereinafter, preferred embodiments of the invention will be described in detail with reference to the drawings.

FIGS. 1 to 5 relate to a first embodiment of the invention. Of these figures, FIG. 1 is a block diagram showing the arrangement of an automatic focusing single-lens reflex camera which serves an optical apparatus according to a first embodiment of the invention. In FIG. 1, full lines indicate electrical connection and broken lines indicate mechanical connection.

Figure 2:
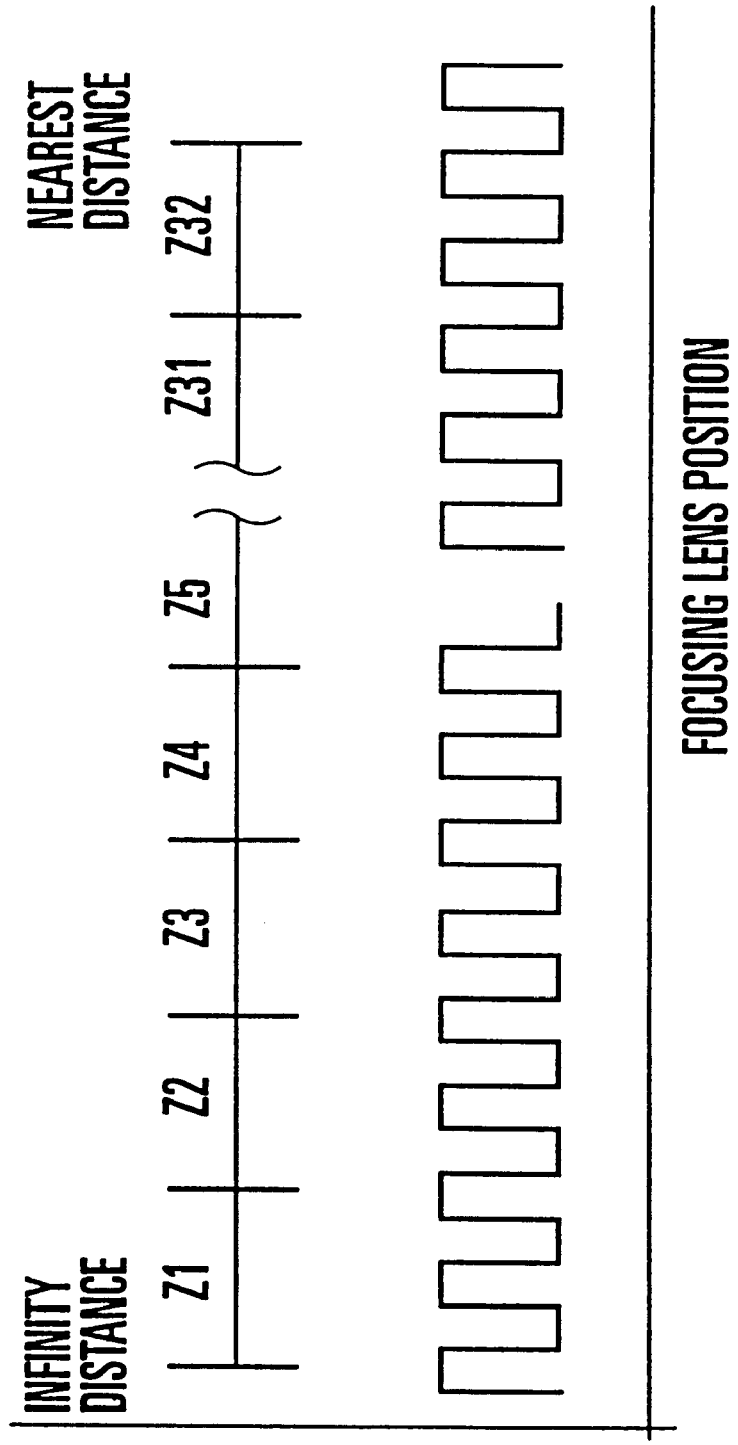
FIG. 2 is a diagram for explaining the operations of encoders 14 and 15 shown in FIG. 1.

In FIG. 2, reference numeral 1 denotes a camera body and reference numeral 2 denotes a lens body. A microcomputer 3 (hereinafter referred to as the camera microcomputer) is arranged in the camera body 1 to control the actions of various devices disposed within the camera body 1 and also to communicate with the lens body 2 through a contact part 4 when the lens body 2 is mounted on the camera body 1.

A release switch 5 is arranged to be operated with two step strokes from outside. Signals from the release switch 5 are sent to the camera microcomputer 3. When a first stroke switch SW1 of the release switch 5 is turned on by a first step stroke of operation performed thereon, preparation is made for photo-taking by deciding an amount of exposure with a light measuring device (not shown) and performing an AF action which will be described later. When a second stroke switch SW2 is turned on with the release switch 5 operated (pushed further) by a second step stroke, the camera microcomputer 3 sends a photo-taking starting instruction to a photo-taking device 6 to cause the photo-taking device 6 to carry out an actual exposure action. Upon receipt of a photo-taking ending signal from the photo-taking device 6, the camera microcomputer 3 sends a film-transport starting instruction to a film transport device (not shown). Upon receipt of the instruction, the film transport device performs a film winding action.

A focus detecting device 7 is arranged to detect focus on an object existing within a focus detecting area according to a focus detecting instruction coming from the camera microcomputer 3 when the switch SW1 of the release switch 5 is turned on in the case of setting of an AF mode, to decide the direction and amount of moving a focusing lens 8 within the lens body 2 necessary for focusing on the object by prediction when prediction is possible or decide the prediction to be impossible with no object existing within the focus detecting area, and to send information on the result of the decision to the camera microcomputer 3.

A microcomputer 9 (hereinafter referred to as the lens microcomputer) is arranged inside the lens body 2 to control various devices disposed within the lens body 2 and to communicate with the camera body 1 through a contact part 10.

An automatic/manual operation change-over switch 11 (hereinafter referred to as the A/M switch), which is operable from outside, is arranged to permit selection of an AF mode or an MF mode. In the AF mode, a result of focus detection made by the focus detecting device 7 in response to the turning-on of the switch SW1 of the release switch 5 is transferred from the camera microcomputer 3 to the lens microcomputer 9. The lens microcomputer 9 then causes a focus driving device 12 which is a drive source such as a motor or the like to start operating on the basis of the result of detection. The driving force of the focus driving device 12 is transmitted to a focus driving mechanism 13 which is a driving force transmitting mechanism. The focusing lens 8 is then moved by the driving force transmitted.

An absolute value encoder 14 and a relative value encoder 15 are arranged to send their detection signals to the lens microcomputer 9. The absolute value encoder 14 is disposed at a part of a transmission mechanism of the focus driving mechanism 13 and is formed, for example, with a fixed Gray code pattern (not shown) and electric contacts (not shown) opposed to the Gray code pattern. The absolute value encoder 14 is thus arranged to detect the absolute position of the focusing lens 8 by detecting the state of the Gray code pattern through the electric contacts thereof according to the movement of the focusing lens 8.

The relative value encoder 15 is disposed at a part of the transmission mechanism of the focus driving mechanism 13 and is formed, for example, with a fixed photo-interrupter (not shown) and a pulse plate which is arranged between the light-emitting and light-receiving parts of the photo-interrupter to transmit and block light. The relative value encoder 15 is thus arranged to detect the relative position of the focusing lens 8 by outputting a pulse signal which turns on and off accordingly as the focusing lens 8 moves and by counting the number of pulses of the pulse signal.

The resolution of the absolute value encoder 14 is obtained by dividing the maximum moving stroke of the focusing lens 8, for example, into 32 parts (5 bits). The resolution of the absolute value encoder 14 is thus arranged to be used for limiting the movable range of the focusing lens 8. The relative value encoder 15 is arranged to have a resolution which is at least equal to a degree of stopping precision required in bringing the focusing lens 8 to a stop and which satisfies a required rate of focusing accuracy determined according to the F-number and the focal length.

FIG. 2 shows the relation of pulses outputted from the relative value encoder 15 to the detection zones of the absolute value encoder 14, i.e., a relation between their resolutions. In FIG. 2, the abscissa axis indicates the position of the focusing lens 8. The area of the absolute value encoder 14 for detection of the absolute position of the focusing lens 8 between the infinity-distance-end and nearest-distance-end positions thereof is divided into 32 zones, i.e., zones Z1 to Z32. The pulses outputted from the relative value encoder 15 correspond to the above-mentioned resolution of the relative value encoder 15, which is arranged at least to be finer than the resolution of the absolute value encoder 14.

The lens microcomputer 9 controls the focus driving device 12 according to input of information. The lens microcomputer 9 stops the focus driving device 12 at a point of time when a required amount of moving the focusing lens 8 decided according to the result of focus detection made by the focus detecting device 7 and an actual moving amount detected by the relative value encoder 15 eventually have coincided with each other. Then, the lens microcomputer 9 sends a signal to inform the camera microcomputer 3 of the completion of AF driving.

In the MF (manual focusing) mode, focus is not adjusted on the basis of the result of the above-stated AF action. In the MF mode, focus is adjusted by operating a manual operation member 16 from outside. The manual operation member 16 is interlocked with the focus driving mechanism 13 through a mechanical cam or the like. The focusing lens 8 can be moved by operating the manual operation member 16 from outside. Therefore, in the MF mode, the user is able to move the focusing lens 8 as desired by operating the manual operation member 16 irrespective of the operation on the release switch 5.

A zone change-over switch 17 is arranged to permit selection and change-over of the movable range of the focusing lens 8 in the AF or MF mode by operating the zone change-over switch 17 from outside. More specifically, a normal movable range of the focusing lens 8 can be selected by turning the zone change-over switch 17 off, while a narrower limited range can be selected by turning the zone change-over switch 17 on. Information on the result of selection of the movable range of the focusing lens 8 is sent from the zone change-over switch 17 to the lens microcomputer 9. In accordance with the output of the zone change-over switch 17, if the zone change-over switch 17 is turned on, the lens microcomputer 9 controls, at the time of the AF or ME action, the focus driving device 12 while monitoring the output of the absolute value encoder 14, in such a way as to inhibit the focusing lens 8 from being driven to the outside of the selected range.

Switches 18 and 19 are provided for the FP (focus preset) function. Both the FP storing switch 18 and the FP driving switch 19 are arranged to be operable from outside and to send their outputs to the lens microcomputer 9. The FP function is carried out as follows.

With the FP storing switch 18 operated at a desired focusing lens position beforehand, the focusing lens 8 can be instantly moved back to the desired position with a motor by operating the FP driving switch 19, even after the focusing lens 8 is moved by an AF (automatic focusing) or MF (manual focusing) actions.

The first embodiment operates to carry out the focus preset (FP) function as described below.

Figure 3:
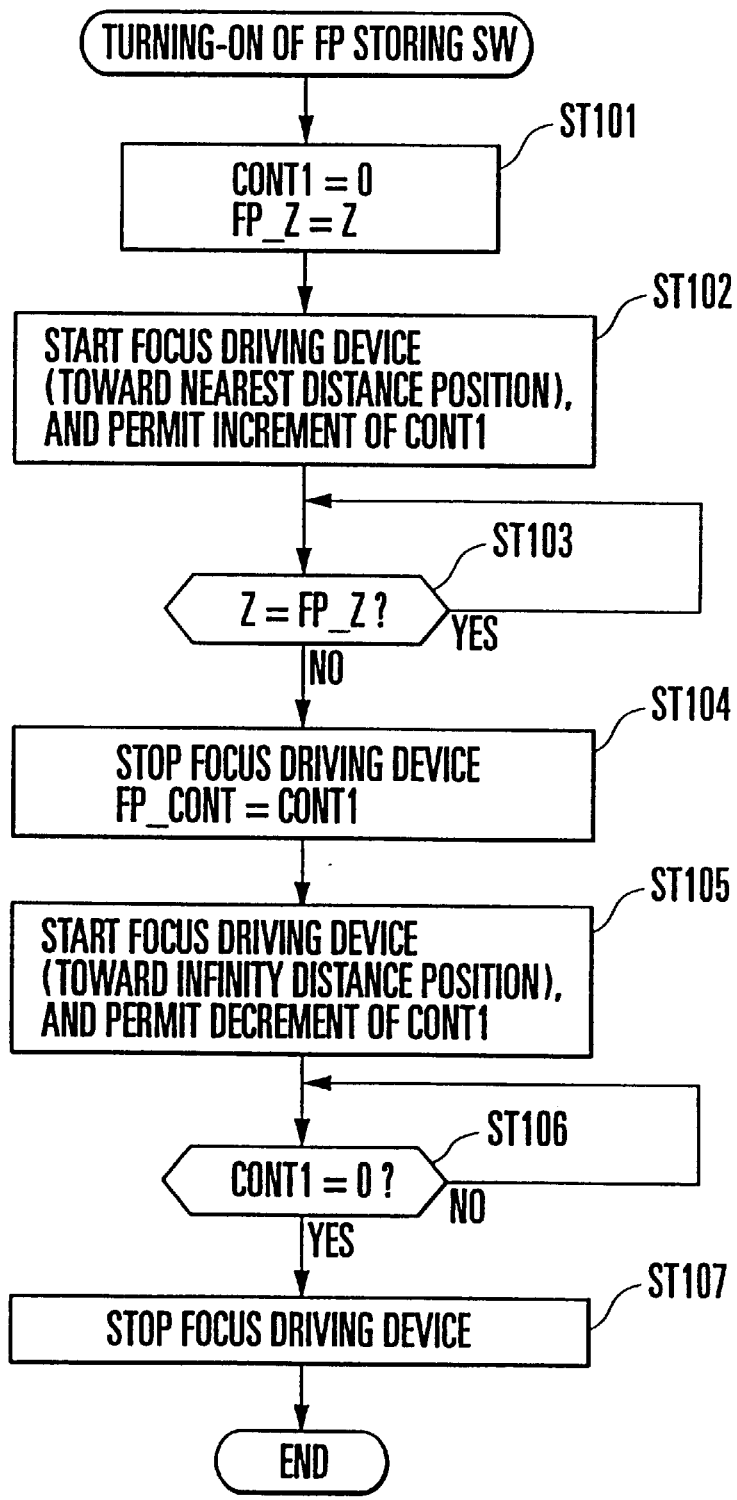
FIG. 3 is a flow chart showing a flow of storing actions in a first embodiment of the invention.
Figure 4:
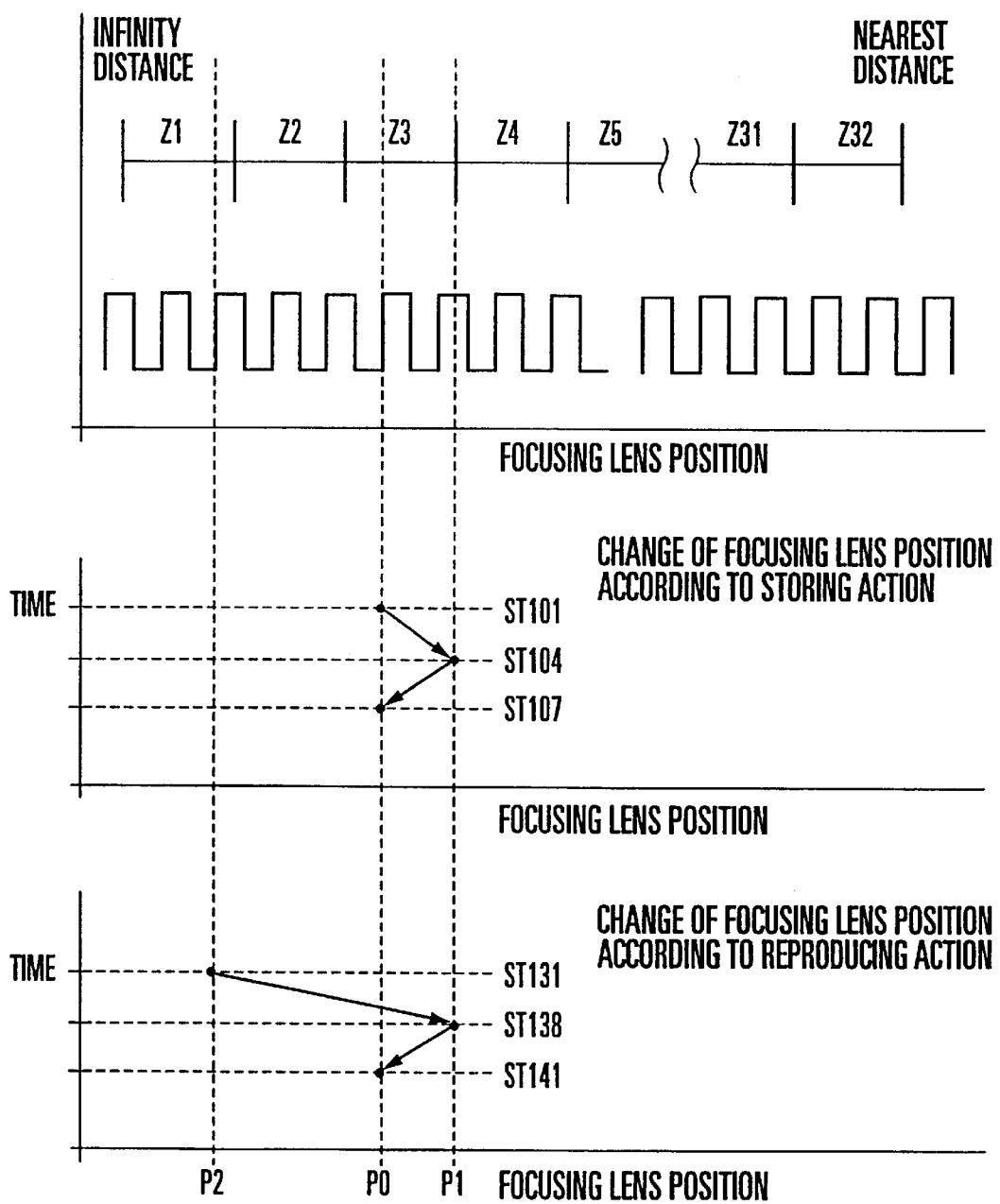
FIG. 4 is a diagram for explaining the operation of the first embodiment.

FIGS. 3 and 4 relate to focusing lens position storing actions of the first embodiment performed with the FP storing switch 18 operated. FIG. 3 shows a flow of a focusing lens position storing operation of the lens microcomputer 9 executed with the FP storing switch 18 operated. FIG. 4 shows changes of the focusing lens position taking place according to the operation of the FP storing switch 18. The flow of the storing operation shown in FIG. 3 is described below with the current position of the focusing lens 8 assumed to be a position P0 within a zone Z3 (Z=3) of the absolute value encoder 14 as shown in FIG. 4.

Step ST101: With the FP storing switch 18 operated, the lens microcomputer 9 resets a counter CONT1 disposed therein at "0" and stores the current detection zone value Z of the absolute value encoder 14 into a variable FP_Z (FP_Z=3).

Step ST102: The lens microcomputer 9 starts the focus driving device 12 to move the focusing lens 8 toward a nearest-distance-end position thereof, as shown in FIG. 4, and, at the same time, permits the counter CONT1 to increment its count value. The count value of the counter CONT1 is thus incremented accordingly as the output of the relative value encoder 15 varies following the movement of the focusing lens 8.

Step ST103: Changes taking place in the output of the absolute value encoder 14 following the movement of the focusing lens 8 are monitored. The step ST103 is repeated as long as the output of the absolute value encoder 14 shows "Z=FP_Z". When the output of the absolute value encoder 14 comes to show "Z≠FP_Z" (Z=4), the flow proceeds to a step ST104.

Step ST104: The focus driving device 12 is brought to a stop at a position P1. The count value of the counter CONT1 is stored into a variable FP_CONT.

Step ST105: The focus driving device 12 is started to move the focusing lens 8 toward an infinity-distance-end position thereof as shown in FIG. 4. At the same time, the counter CONT1 is permitted to decrement its count value. The count value of the counter CONT1 is thus decremented accordingly as the output of the relative value encoder 15 varies following the movement of the focusing lens 8.

Step ST106: The change of the count value of the counter CONT1 which takes place following the movement of the focusing lens 8 is monitored. The step ST106 is repeated as long as the count value of the counter CONT1 is not zero. When the count value of the counter CONT1 becomes zero, the flow proceeds to a step ST107.

Step ST107: The focus driving device 12 is brought to a stop (at the position P0), and the storing operation comes to an end.

According to the flow of operation described above, the position P0 of the focusing lens 8 obtained at a point of time when the FP storing switch 18 has been operated is stored as a position located away from one end of the zone FP_Z on the side of the nearest-distance-end position, i.e., from a boundary between the zones Z3 and Z4, toward the other end of the same zone on the side of the infinity-distance-end position of the focusing lens 8 as much as the variable FP_CONT in number of pulses of the relative value encoder 18. Then, the focusing lens 8 comes to a stop again at the position P0 obtained at the point of time when the FP storing switch 18 has been operated.

Figure 5:
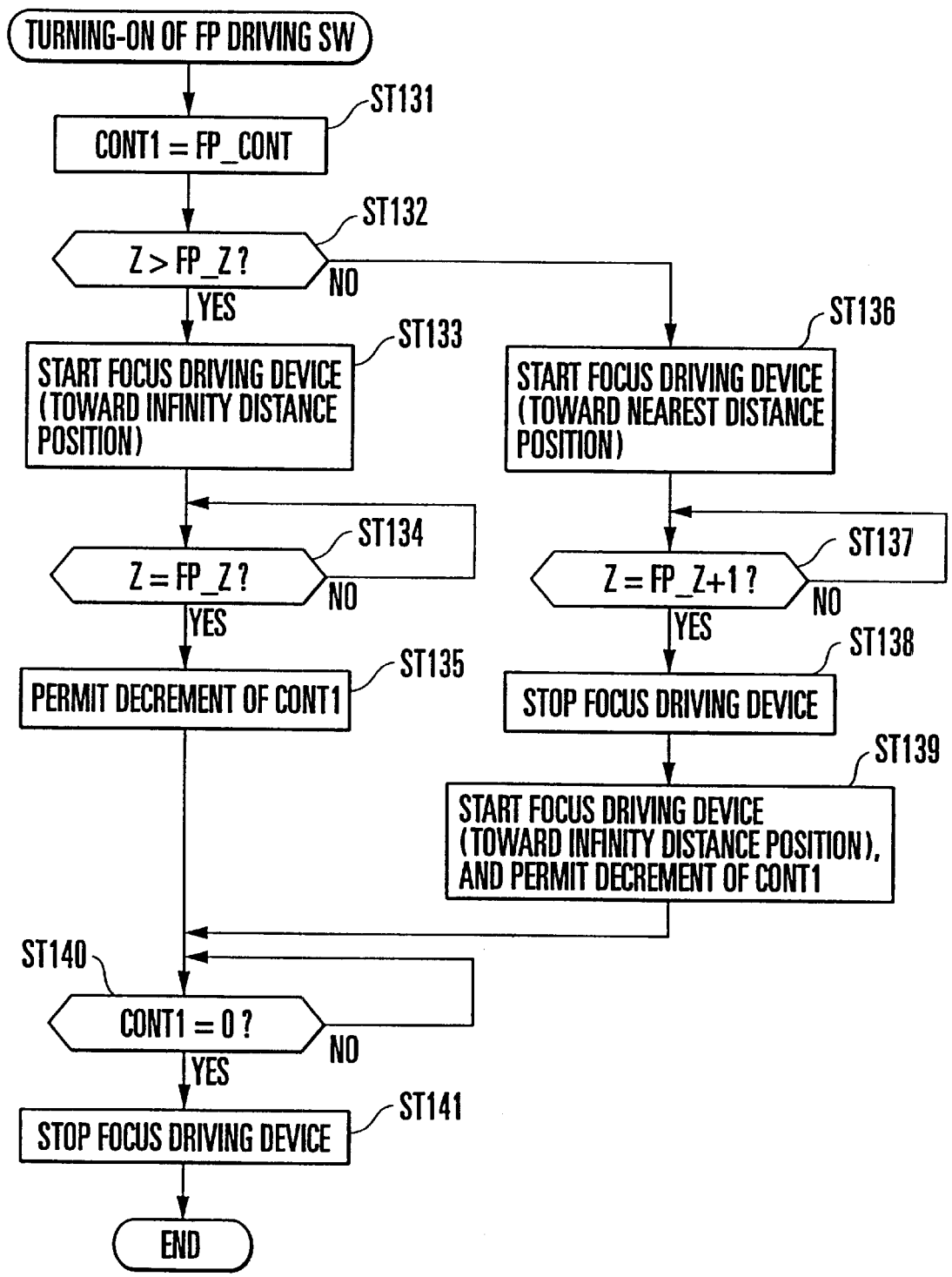
FIG. 5 is a flow chart showing a flow of reproducing actions in the first embodiment.

Next, a reproducing operation for the position of the focusing lens 8 with the FP driving switch 19 operated is described with reference to FIGS. 4 and 5. FIG. 5 is a flow chart showing the flow of the focusing lens position reproducing operation of the lens microcomputer 9 performed with the FP driving switch 19 operated. The following description of flow of the focusing lens position reproducing operation shown in FIG. 5 is given on the assumption that the current position of the focusing lens 8 is a position P2 within the zone Z1 (Z=1) of the absolute value encoder 14 as shown in FIG. 4.

Step ST131: The focusing lens 8 is assumed to have been moved either by an AF (automatic focusing) action or by an MF (manual focusing) action after the above-stated focusing lens position storing operation. With the focusing lens 8 thus moved, when the FP driving switch 19 is operated, the variable FP_CONT stored in the above-stated storing operation is transferred to the counter CONT1.

Step ST132: The current detection zone value Z of the absolute value encoder 14 is compared with the stored variable FP_Z. If the result of comparison is "Z>FP_Z", the flow of operation proceeds from the step ST132 to a step ST133. If not, the flow proceeds from the step ST132 to a step ST136.

Step ST133: The focus driving device 12 is started to move the focusing lens 8 toward the infinity-distance-end position shown in FIG. 4.

Step ST134: Changes taking place in the output of the absolute value encoder 14 following the movement of the focusing lens 8 are monitored and checked. The check of the step ST134 is repeated if the output of the absolute value encoder 14 is found to show "Z≠FP_Z". When the output of the absolute value encoder 14 comes to show "Z=FP_Z" (Z=3), the flow proceeds to a step ST135.

Step ST135: The counter CONT1 is permitted to decrement its count value. The count value of the counter CONT1 is thus decremented accordingly as the output of the relative value encoder 15 varies following the movement of the focusing lens 8. The flow then proceeds to a step ST140.

Step ST136: The focus driving device 12 is started to move the focusing lens 8 toward the nearest-distance-end position shown in FIG. 4.

Step ST137: Changes taking place in the output of the absolute value encoder 14 following the movement of the focusing lens 8 are monitored and checked. The check of the step ST137 is repeated if the output of the absolute value encoder 14 is found to show "Z≠FP_Z+1". When the output of the absolute value encoder 14 comes to show "Z=FP_Z+1" (Z=4), the flow proceeds to a step ST138.

Step ST138: The focus driving device 12 is brought to a stop (at the position P1 shown in FIG. 4).

Step ST139: The focus driving device 12 is started to move the focusing lens 8 toward an infinity-distance-end position thereof shown in FIG. 4. At the same time, the counter CONT1 is permitted to decrement its count value. The count value of the counter CONT1 is thus decremented accordingly as the output of the relative value encoder 15 varies following the movement of the focusing lens 8. The flow then proceeds to the step ST140.

Step ST140: Changes taking place in the count value of the counter CONT1 following the movement of the focusing lens 8 are monitored and checked. The check of the step ST140 is repeated if the count value of the counter CONT1 is found to be not zero. When the output value of the counter CONT1 becomes zero, the flow proceeds to a step ST141.

Step ST141: The focus driving device 12 is brought to a stop (at the position P0), and the focusing lens position reproducing operation comes to an end.

The focusing lens position reproducing operation described above is thus performed first to temporarily move the focusing lens 8 to one end of the zone FP_Z, which has been stored in the above storing action, on the side of the nearest-distance-end position, i.e., the lens is moved to a boundary between the zones Z3 and Z4. After that, the focusing lens 9 is moved toward the other end of the zone FP_Z on the side of the infinity-distance-end position as much as a distance corresponding to the variable FP_CONT, which has been stored in the above storing action, so that the focusing lens 8 is eventually brought to the position obtained at the point of time when the FP storing switch 18 has been operated.

As described above, in accordance with the first embodiment, the automatic focusing single-lens reflex camera having a full-time manual operating function whereby the lens can be moved in the direction of an optical axis by a mechanical cam interlocked with a manual operation member is arranged to carry out the focus preset (FP) function which includes storing and reproducing actions. In the storing action, a position of the focusing lens 8 obtained at a point of time when the FP storing switch 18 has been operated is stored as zone information on the zone of the absolute value encoder and information on the number of pulses of the relative value encoder counted from one end of the applicable zone in the predetermined direction. In the (preset position) reproducing action, the focusing lens 8 is temporarily moved to the end in the predetermined direction of the zone stored in the storing action and, after that, the focusing lens 8 is moved as much as the number of pulses of the relative value encoder which has also been stored in the storing action.

Figure 6:
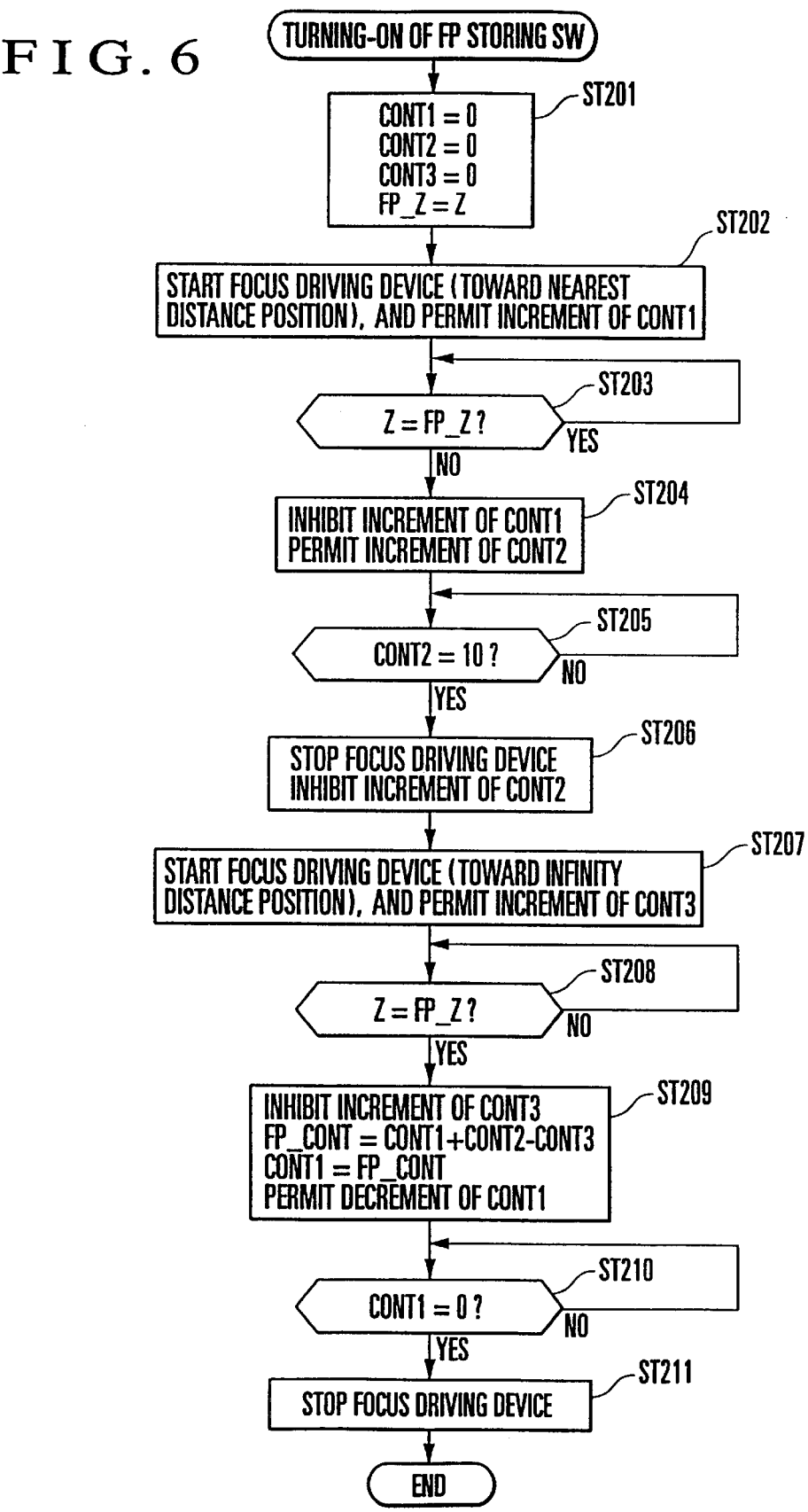
FIG. 6 is a flow chart showing a flow of storing actions in a second embodiment of the invention.
Figure 7:
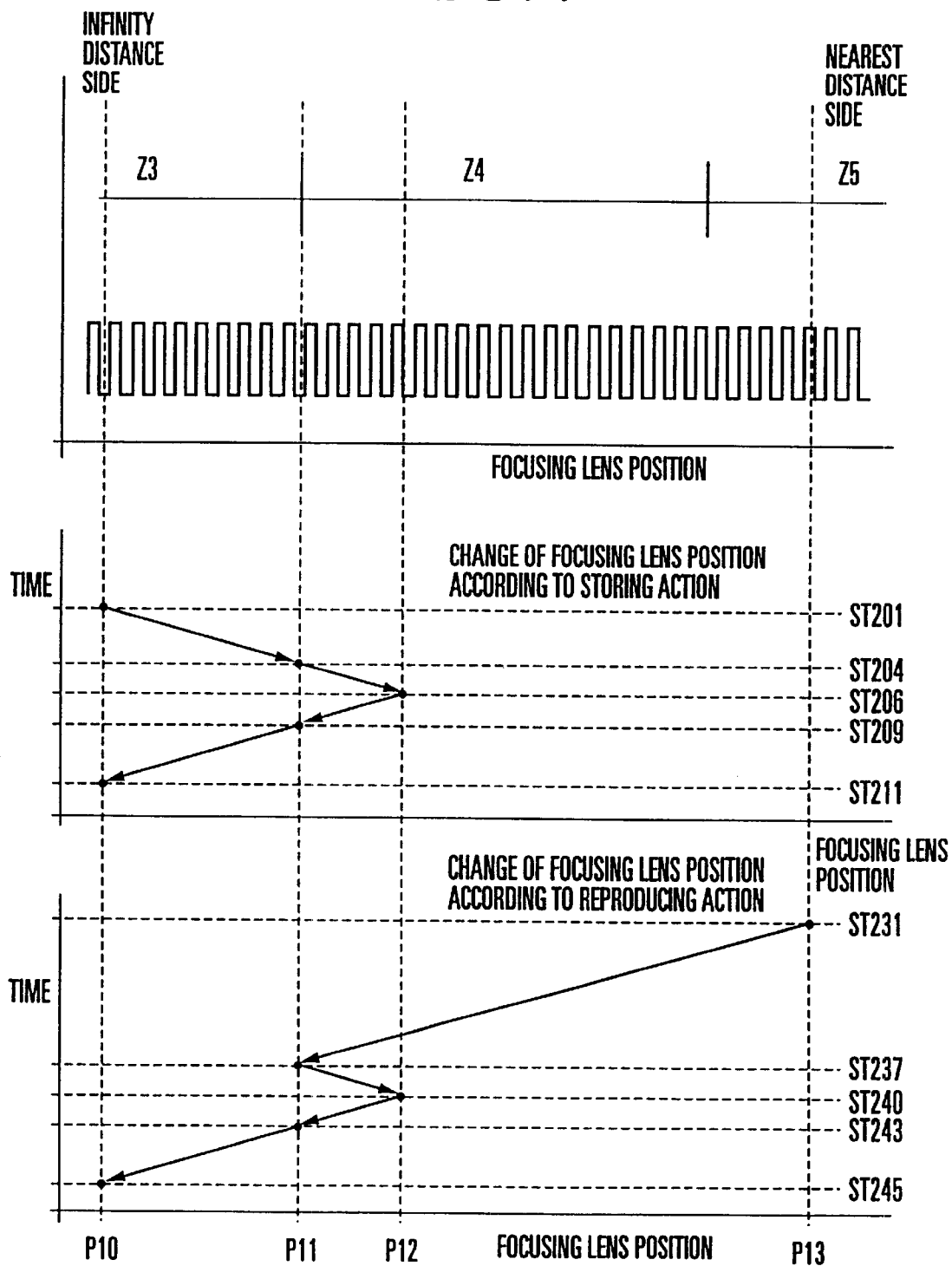
FIG. 7 is a diagram for explaining the operation of the second embodiment.
Figure 8:
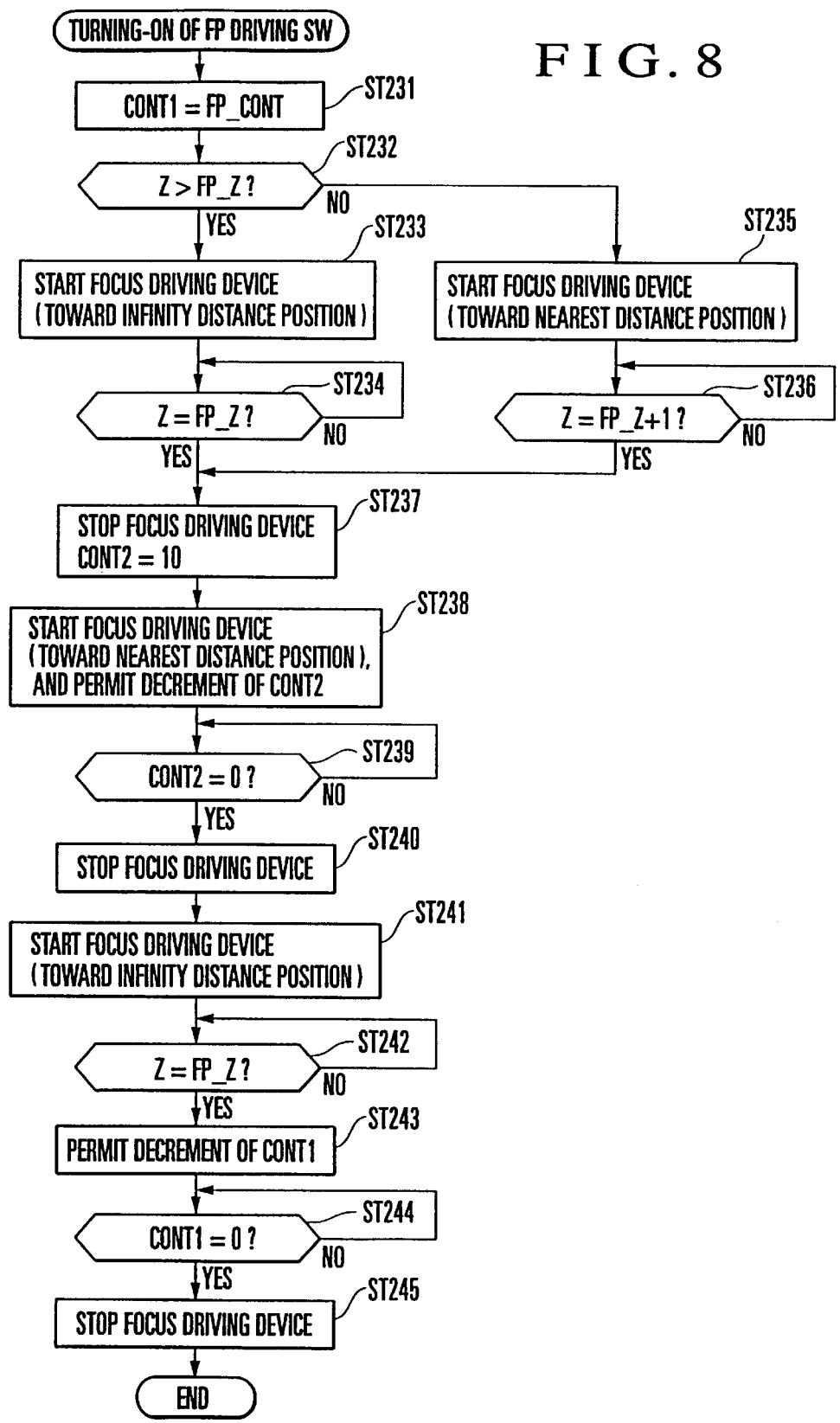
FIG. 8 is a flow chart showing a flow of reproducing actions in the second embodiment.

The following describes a second embodiment of the invention with reference to FIGS. 6, 7 and 8.

The second embodiment is applied to an automatic focusing single-lens reflex camera which is of the same structural arrangement as that of the first embodiment. Therefore, the structural arrangement of the second embodiment is omitted from the following description.

The focus preset (FP) function in the second embodiment is performed in the following manner.

The focusing lens position storing action to be performed in the second embodiment when the FP storing switch 18 is operated is first described referring to FIGS. 6 and 7. FIG. 6 is a flow chart showing a flow of a focusing lens position storing operation to be executed by the lens microcomputer 9 when the FP storing switch 18 is operated. FIG. 7 shows the changes of the focusing lens position taking place according to the operation of the FP storing switch 18. The flow of the storing operation shown in FIG. 6 is described below with the current position of the focusing lens 8 assumed to be a position P10 within a zone Z3 (Z=3) of the absolute value encoder 14 as shown in FIG. 7.

Step ST201: With the FP storing switch 18 operated, the lens microcomputer 9 resets counters CONT1, CONT2 and CONT3 disposed therein at "0" and stores the current detection zone value Z of the absolute value encoder 14 into a variable FP_Z (FP_Z=3).

Step ST202: The lens microcomputer 9 starts the focus driving device 12 to move the focusing lens 8 toward a nearest-distance-end position thereof shown in FIG. 7 and, at the same time, permits the counter CONT1 to increment its count value. The count value of the counter CONT1 is thus incremented accordingly as the output of the relative value encoder 15 varies following the movement of the focusing lens 8.

Step ST203: Changes taking place in the output of the absolute value encoder 14 following the movement of the focusing lens 8 are monitored. The step ST203 is repeated as long as the output of the absolute value encoder 14 shows "Z=FP_Z". When the output of the absolute value encoder 14 comes to show "Z≠FP_Z" (Z=4), the flow proceeds to a step ST204.

Step ST204: The increment of the counter CONT1 is inhibited (at a position P11). The counter CONT2 is permitted to increment its count value. The count value of the counter CONT2 is thus incremented accordingly as the output of the relative value encoder 15 varies following the movement of the focusing lens 8.

Step ST205: Changes in count value of the counter CONT2 taking place following the movement of the focusing lens 8 are monitored. The count value of the counter CONT2 is compared with a predetermined value (for example, 10 pulses). The step ST205 is repeated until the count value of the counter CONT2 becomes 10 pulses (CONT2=10). The flow then proceeds from the step ST205 to a step ST206.

ST206: The focus driving device 12 is brought to a stop (at a position P12). The increment of the count value of the counter CONT2 is inhibited.

ST207: The focus driving device 12 is started to move the focusing lens 8 toward an infinity distance end position thereof shown in FIG. 7. At the same time, the counter CONT3 is permitted to increment its count value. The count value of the counter CONT3 is thus incremented accordingly as the output of the relative value encoder 15 varies following the movement of the focusing lens 8.

Step ST208: Changes taking place in the output of the absolute value encoder 14 following the movement of the focusing lens 8 are monitored. The step ST208 is repeated as long as the output of the absolute value encoder 14 shows "Z≠FP_Z". When the output of the absolute value encoder 14 comes to show "Z=FP_Z" (Z=3), the flow proceeds to a step ST209.

Step ST209: The increment of the count value of the counter CONT3 is inhibited (at the position P11). A variable FP_CONT is obtained by the following formula (1):

$$FP\_CONT = CONT1 + CONT2 - CONT3 \qquad (1).$$

The variable FP_CONT thus obtained is inputted to the counter CONT1, and the decrement of the count value of the counter CONT1 is permitted. The count value of the counter CONT1 is decremented accordingly as the output of the relative value encoder 15 varies following the movement of the focusing lens 8.

Step ST210: Changes taking place in the count value of the counter CONT1 following the movement of the focusing lens 8 are monitored. The step ST210 is repeated until the count value of the counter CONT1 becomes zero (CONT1=0). When the count value of the counter CONT1 becomes zero, the flow proceeds to a step ST211.

Step ST211: The focus driving device 12 is brought to a stop (at the position 10), and the flow of the storing operation comes to an end.

The hysteresis of the output of the absolute value encoder 14 which is caused by the moving direction of the focusing lens 8 is detected from the count values of the counters CONT2 and CONT3 obtained during the flow of operation described above (CONT3-CONT2). Therefore, the variable FP_CONT obtained in the above formula (1) becomes the number of pulses of the relative value encoder 15 obtained between the position of the boundary of the zones Z3 and Z4 and the position P10 of the focusing lens 8 in a case where the focusing lens is moved from the nearest distance side to the infinity distance side.

According to the storing operation described above, the position P10 of the focusing lens 8 obtained at a point of time when the FP storing switch 18 has been operated is stored as a position located away from one end of the zone FP_Z on the side of the nearest-distance-end position (a boundary between the zones Z3 and Z4) toward the other end of the same zone on the side of the infinity-distance-end position of the focusing lens 8 as much as the variable FP_CONT1 in number of pulses of the relative value encoder 18 when the focusing lens 8 is moved from the nearest distance side to the infinity distance side. Then, the focusing lens 8 comes to a stop again at the position P10 obtained at the point of time when the FP storing switch 18 has been operated.

A reproducing operation for the position of the focusing lens 8 in the second embodiment with the FP driving switch 19 operated is described with reference to FIGS. 8 and 7. FIG. 8 is a flow chart showing the flow of the focusing lens position reproducing operation in the second embodiment of the lens microcomputer 9 performed with the FP driving switch 19 operated. The following description of the flow of the focusing lens position reproducing operation shown in FIG. 8 is given on the assumption that the current position of the focusing lens 8 is a position P13 within a zone Z5 (Z=5) of the absolute value encoder 14 shown in FIG. 7.

Step ST231: The focusing lens 8 is assumed to have been moved either by an AF action or by an MF action after the above-stated focusing lens position storing operation. With the focusing lens 8 thus moved, when the FP driving switch 19 is operated, the variable FP_CONT stored in the above-stated storing operation is transferred to the counter CONT1.

Step ST232: The current detection zone value Z of the absolute value encoder 14 is compared with the stored variable FP_Z. If the result of comparison is "Z>FP_Z", the flow of operation proceeds from the step ST232 to a step ST233. If not, the flow proceeds from the step ST232 to a step ST235.

Step ST233: The focus driving device 12 is started to move the focusing lens 8 toward the infinity-distance-end position shown in FIG. 7.

Step ST234: Changes taking place in the output of the absolute value encoder 14 following the movement of the focusing lens 8 are monitored and checked. The check of the step ST234 is repeated if the output of the absolute value encoder 14 is found to show "Z≠FP_Z". When the output of the absolute value encoder 14 comes to show "Z=FP_Z" (Z=3), the flow proceeds to a step ST237.

Step ST235: The focus driving device 12 is started to move the focusing lens 8 toward the nearest-distance-end position shown in FIG. 7.

Step ST236: Changes taking place in the output of the absolute value encoder 14 following the movement of the focusing lens 8 are monitored and checked. The check of the step ST236 is repeated if the output of the absolute value encoder 14 is found to show "Z≠FP_Z+1". When the output of the absolute value encoder 14 comes to show "Z=FP_Z+1" (Z=4), the flow proceeds to the step ST237.

Step ST237: The focus driving device 12 is brought to a stop (at the position P11). The predetermined number of pulses, which is, for example, "10", is set at the second counter CONT2.

Step ST238: The focus driving device 12 is started to move the focusing lens 8 toward the nearest-distance-end position shown in FIG. 7. The counter CONT2 is permitted to decrement its count value. The count value of the counter CONT2 is thus decremented accordingly as the output of the relative value encoder 15 varies following the movement of the focusing lens 8.

Step ST239: Changes in the count value of the counter CONT2 taking place following the movement of the focusing lens 8 are monitored and checked. The check of the step ST239 is repeated if the count value of the counter CONT2 is not zero. When the count value of the counter CONT2 becomes zero (CONT2=0), the flow proceeds to a step ST240.

Step ST240: The focus driving device 12 is brought to a stop (at the position P12).

Step ST241: The focus driving device is started to move the focusing lens 8 toward the infinity-distance-end position shown in FIG. 7.

Step ST242: Changes taking place in the output of the absolute value encoder 14 following the movement of the focusing lens 8 are monitored. The step ST203 is repeated as long as the output of the absolute value encoder 14 shows "Z≠FP_Z". When the output of the absolute value encoder 14 comes to show "Z=FP_Z" (Z=3), the flow proceeds to a step ST243.

Step ST243: The counter CONT1 is permitted to decrement its count value (at the position P11). The count value of the counter CONT1 is decremented according to changes taking place in the output of the relative value encoder 15 following the movement of the focusing lens 8.

Step ST244: Changes taking place in the count value of the counter CONT1 following the movement of the focusing lens 8 are monitored and checked. The check of the step ST244 is repeated if the count value of the counter CONT1 is found to be not zero. When the output value of the counter CONT1 becomes zero, the flow proceeds to a step ST245.

Step ST245: The focus driving device 12 is brought to a stop (at the position P10), and the focusing lens position reproducing operation comes to an end.

The focusing lens position reproducing operation described above is thus performed first to temporarily move the focusing lens 8 to the zone FP_Z+1 (a zone obtained by incrementing the zone FP_Z by one) stored in the above-stated storing action. After that, the focusing lens 8 is moved from one end of the zone FP_Z on the side of the nearest-distance-end position, i.e., a boundary between the zones Z3 and Z4, toward the other end of the zone FP_Z on the side of the infinity-distance-end position as much as a distance corresponding to the variable FP_CONT stored in the storing action when the focusing lens 8 is moved from the nearest distance side to the infinity distance side, so that the focusing lens 8 is eventually brought to a position obtained at the point of time when the FP storing switch 18 has been operated.

As described above, the automatic focusing single-lens reflex camera having a full-time manual operating function whereby the lens can be moved in the direction of an optical axis by a mechanical cam interlocked with a manual operation member is arranged to carry out the focus preset (FP) function which includes storing and reproducing actions. In the storing action, a position of the focusing lens 8 obtained at a point of time when the FP storing switch 18 has been operated is stored as zone information on the zones of the absolute value encoder and information on the number of pulses of the relative value encoder counted from one end of the applicable zone in the predetermined direction when the focusing lens 8 is moved in the predetermined direction. In the (preset position) reproducing action, the focusing lens 8 is temporarily moved to a zone located adjacent to the zone stored in the storing action and, after that, the focusing lens 8 is moved as much as the number of pulses of the relative value encoder, which is also stored in the storing action, from one end of the zone in the predetermined direction, which is the same as the direction used in the storing action. The focus preset function thus can be accurately performed without any adverse effect on the hysteresis of the output of the absolute value encoder caused by the moving direction of the focusing lens 8.

Figure 9:
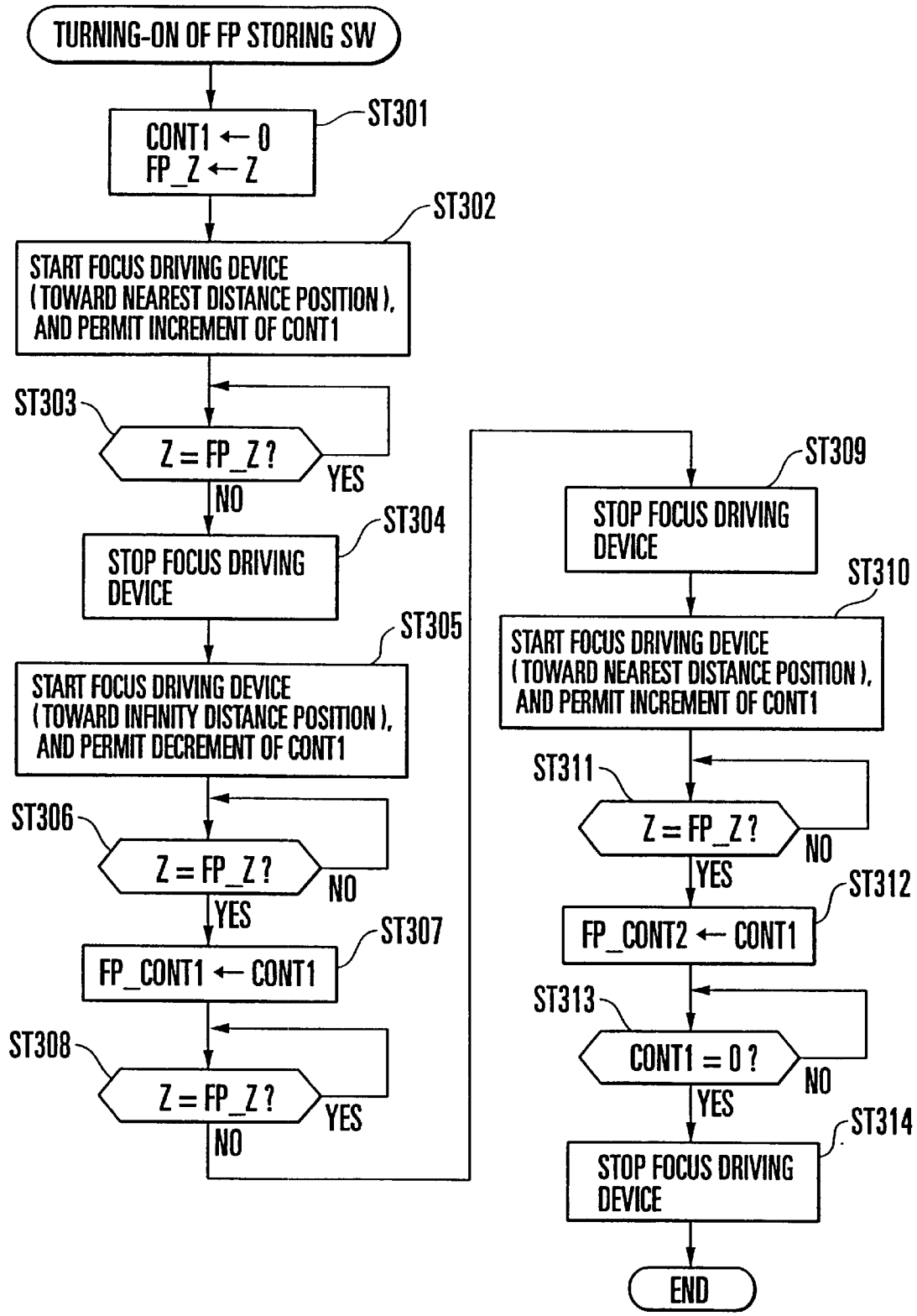
FIG. 9 is a flow chart showing a flow of storing actions in a third embodiment of the invention.
Figure 10:
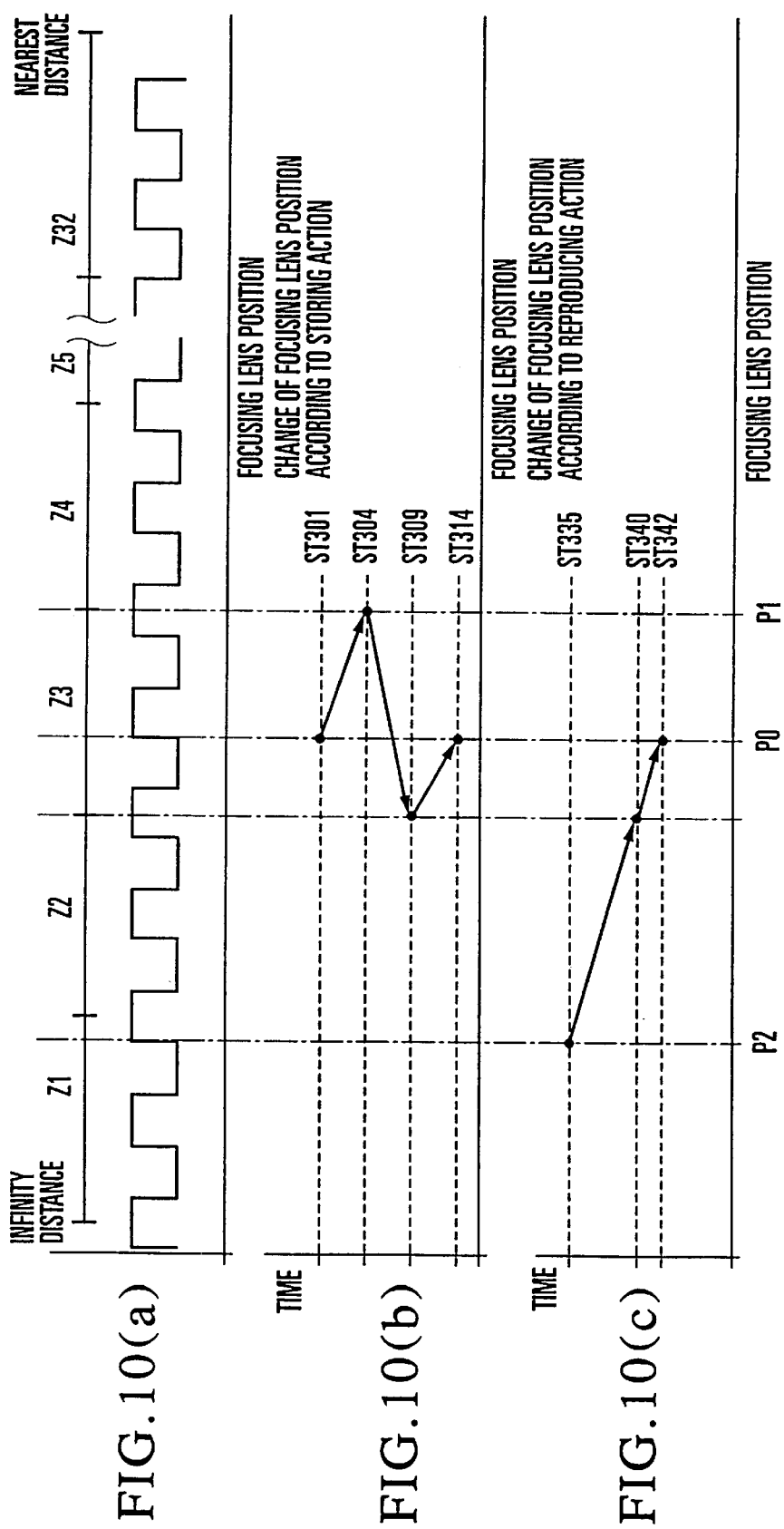
FIGS. 10(a) to 10(c) are diagrams for explaining the operation of the third embodiment.
Figure 11:
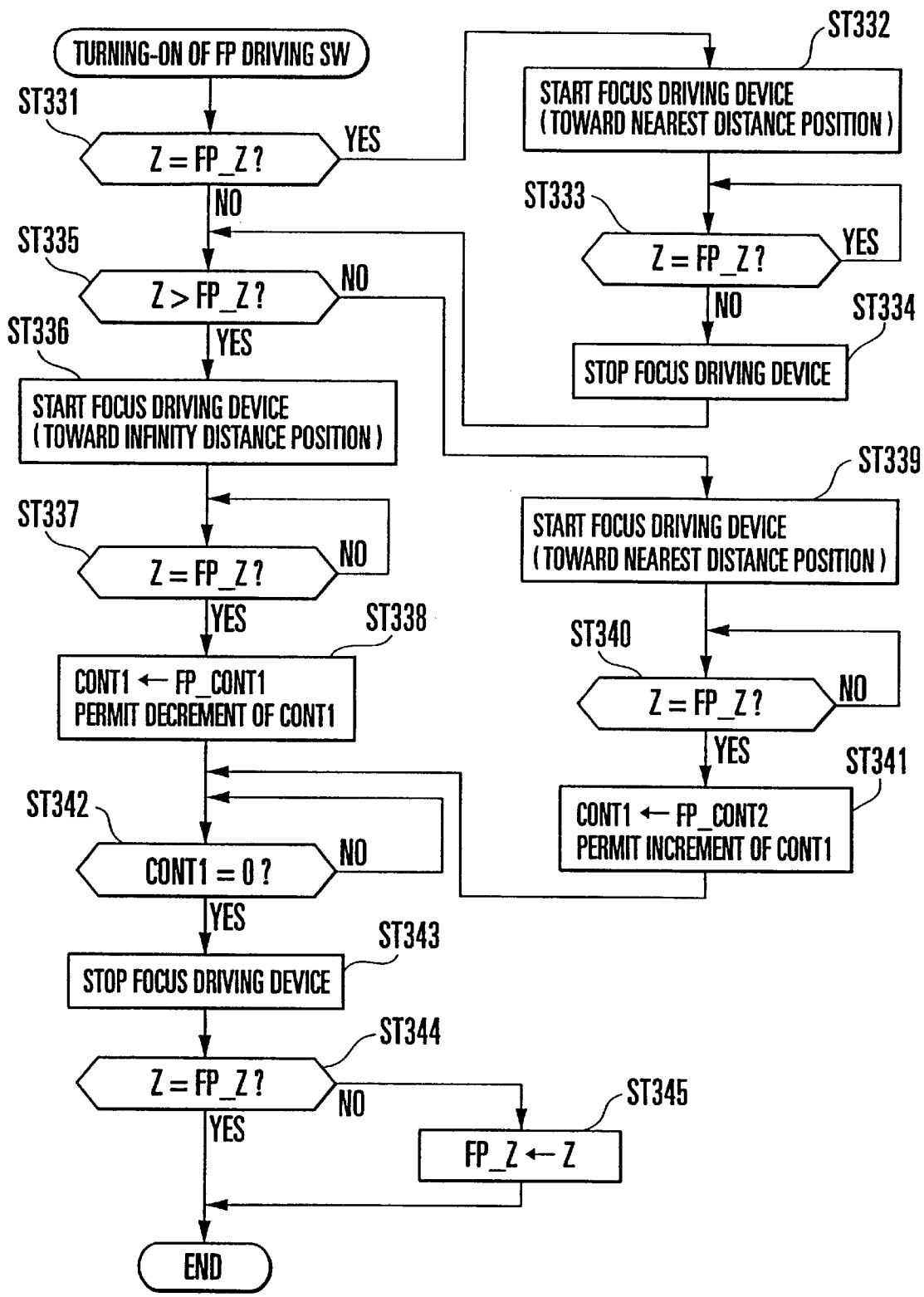
FIG. 11 is a flow chart showing a flow of reproducing actions in the third embodiment.
Figure 12:
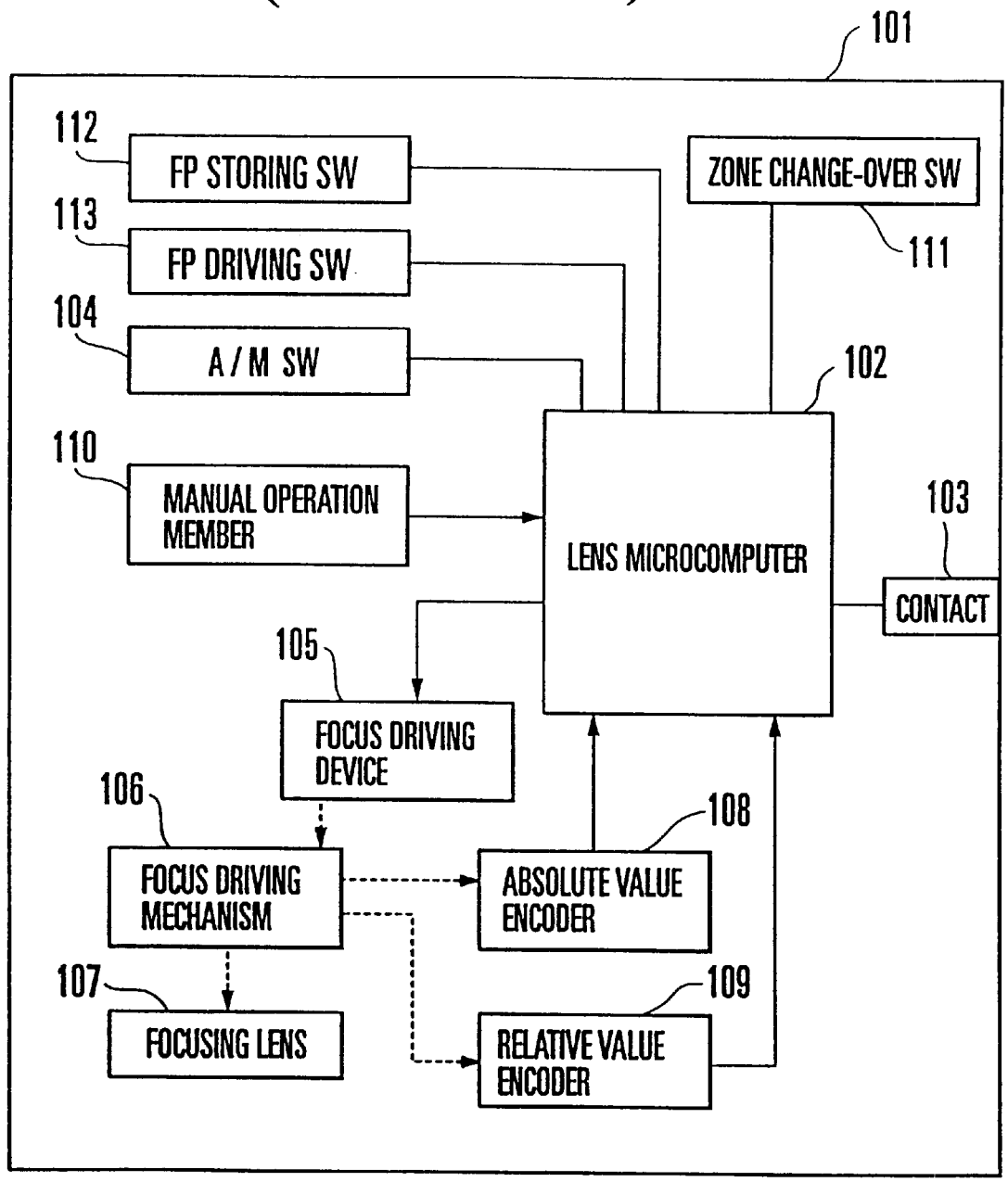
FIG. 12 is a block diagram showing the arrangement of the conventional interchangeable lens having the focus preset function.

FIGS. 9 to 11 relate to a third embodiment of the invention. The third embodiment is applied to an automatic focusing single-lens reflex camera which is of the same structural arrangement as that of the camera shown in FIG. 1.

The focus preset (FP) function in the third embodiment is described as follows.

The storing action for the position of the focusing lens 8 in the third embodiment performed with the FP storing switch 18 operated is first described with reference to FIG. 9 and FIGS. 10(a) to 10(c).

FIG. 9 is a flow chart showing a flow of the focusing lens position storing operation to be executed by the lens microcomputer 9 with the FP storing switch 18 operated. FIG. 10(b) shows changes of the focusing lens position caused by the operation on the FP storing switch 18. The following description of the flow of operation shown in FIG. 9 is given on the assumption that the current position of the focusing lens 8 is a position P0 within a zone Z3 (Z=3) of the absolute value encoder 14 shown in FIG. 10(b).

The flow of the focusing lens position storing operation begins when the FP storing switch 18 is operated. At a step ST301, the lens microcomputer 9 sets a counter CONT1, which is disposed within the lens microcomputer 9, at "0" and stores the current detection zone value Z of the absolute value encoder 14 into a variable FP_Z (FP_Z=3). At the next step ST302, the lens microcomputer 9 starts the focus driving device 12 to move the focusing lens 8 toward the nearest-distance-end position shown in FIG. 10(b), and, at the same time, permits increment of the count value of the counter CONT1. The count value of the counter CONT1 is incremented according to changes taking place in the output of the relative value encoder 15 following the movement of the focusing lens 8. At a step ST303, changes taking place in the output of the absolute value encoder 14 following the movement of the focusing lens 8 are monitored. The step ST303 is repeated as long as the output of the absolute value encoder 14 remains at "Z=FP_Z". When the output of the absolute value encoder 14 becomes "Z≠FP_Z", the flow proceeds to a step ST304.

At the step ST304, the lens microcomputer 9 causes the focus driving device 12 to stop the focusing lens 8 at a position P1. At the next step ST305, the focus driving device 12 is started to move the focusing lens 8 toward the infinity-distance-end position shown in FIG. 10(b). The lens microcomputer 9, at the same time, permits decrement of the count value of the counter CONT1. Then, the count value of the counter CONT1 is decremented according to changes taking place in the output of the relative value encoder 15 following the movement of the focusing lens 8. At a step ST306, the output of the absolute value encoder 14 is monitored. The step ST306 is repeated until the output of the absolute value encoder 14 comes to show "Z=FP_Z" (Z=3). After that, the flow proceeds from the step ST306 to a step ST307. At the step ST307, the count value of the counter CONT1 is stored into a variable FP_CONT1.

At the next step ST308, the lens microcomputer 9 monitors changes taking place in the output of the absolute value encoder 14 following the movement of the focusing lens 8. The step ST308 is repeated as long as the output of the absolute value encoder 14 shows "Z=FP_Z". When the output of the absolute value encoder 14 comes to show "Z≠FP_Z", the flow proceeds to a step ST309.

At the step ST309, the lens microcomputer 9 brings the focus driving device 12 to a stop. At the next step ST310, the focus driving device 12 is started to move the focusing lens 8 toward the nearest-distance-end position shown in FIG. 10(b). At the same time, the increment of the count value of the counter CONT1 is permitted. The count value of the counter CONT1 is incremented according to changes taking place in the output of the relative value encoder 15 following the movement of the focusing lens 8. At a step ST311, the output of the absolute value encoder 14 is monitored. The step ST311 is repeated until the output of the absolute value encoder 14 comes to show "Z=FP_Z" (Z=3). After that, the flow proceeds to a step ST312. At the step ST312, the count value of the counter CONT1 is stored into a variable FP_CONT2.

At a step ST313, changes in the count value of the counter CONT1 following the movement of the focusing lens 8 are monitored. The step ST313 is repeated until the count value of the counter CONT1 becomes zero (CONT1=0). After that, the flow proceeds from the step ST313 to a step ST314. At the step ST314, the focus driving device 12 is brought to a stop (at the position P0), and the flow of the FP storing operation comes to an end.

In brief, the FP storing operation is performed as follows. The position P0 of the focusing lens 8 obtained at a point of time when the FP storing switch 18 has been operated is stored as a position located away from one end of the zone FP_Z on the side of the nearest-distance-end position (a boundary between the zones Z3 and Z4) toward the other end of the zone on the side of the infinity-distance-end position of the focusing lens 8 as much as a variable FP_CONT1 in number of pulses of the relative value encoder 15. Further, the position P0 of the focusing lens 8 is stored as a position located away from one end of the zone FP_Z on the side of the infinity-distance-end position (a boundary between the zones Z3 and Z2) toward the end of the zone on the side of the nearest-distance-end position as much as the variable FP_CONT2 in number of pulses of the relative value encoder 15. After that, the focusing lens 8 comes to a stop at the position P0 obtained at the point of time when the FP storing switch 18 has been operated.

A reproducing operation for the position of the focusing lens 8 in the third embodiment to be performed with the FP driving switch 19 operated is described with reference to FIGS. 10(a) to 10(c) and FIG. 11.

FIG. 11 is a flow chart showing the flow of the focusing lens position reproducing operation performed with the FP driving switch 19 operated. The following description of the flow of the focusing lens position reproducing operation shown in FIG. 11 is given on the assumption that the current position of the focusing lens 8 is a position P2 within a zone Z1 (Z=1) of the absolute value encoder 14 shown in FIG. 10(c).

At a step ST331 of FIG. 11, with the focusing lens 8 moved either by an AF action or by a manual focusing operation after the above-stated FP storing operation, when the FP driving switch 19 is operated, the lens microcomputer 9 compares the current detection zone value Z of the absolute value encoder 14 with the absolute position FP_Z of the focusing lens 8 stored in the above-stated FP storing operation. If the result of comparison indicates "Z=FP_Z", the flow of operation proceeds from the step ST331 to a step ST332. If the result of comparison indicates "Z≠FP_Z", the flow proceeds to a step ST335.

Since the current detection zone value Z is "1" (Z=1), as shown in FIG. 10(c) in this case, the result of comparison indicates that the value Z is not equal to the position FP_Z (Z≠FP_Z), and the flow proceeds to the step ST335. However, for the purpose of describing the flow of operation to be executed in the event of "Z=FP_Z", the flow is assumed to proceed to the step ST332 with the zone value Z assumed to be "3" (Z=3).

At the step ST332, since the current detection zone value Z of the absolute value encoder 14 is close to the infinity-distance-end position shown in FIG. 10(c), the lens microcomputer 9 causes the focusing lens 8 to move toward the nearest-distance-end position through the focus driving device 12 and the focus driving mechanism 13. Further, if the current detection zone value Z is close to the nearest-distance-end position instead of the infinity-distance-end position, the focusing lens 8 is moved toward the infinity-distance-end position. At the next step ST333, changes taking place in the output of the absolute value encoder 14 following the movement of the focusing lens 8 are monitored. The step ST333 is repeated as long as the zone value Z is equal to the absolute position FP_Z of the focusing lens 8 (Z=FP_Z). After that, when the zone value Z becomes not equal to the absolute position FP_Z (Z≠FP_Z), i.e., Z=4, the flow proceeds to a step ST334. In other words, a focusing lens position reproducing action is performed by temporarily moving the focusing lens 8 to an area other than the area FP_Z if the current focusing lens position is equal to the absolute position FP_Z of the focusing lens 8 stored in the FP storing action. The focusing lens moving amount is thus set when the focusing lens position changes from one area over to another, so that the focusing lens 8 can be accurately brought to a stop by the focusing lens position reproducing action.

At the step ST334, the focus driving device 12 is brought to a stop, and the flow proceeds to the step ST335.

At the step ST335, the current detection zone value Z of the absolute value encoder 14 is compared with the stored variable FP_Z. If the result of comparison indicates "Z>FP_Z", the flow proceeds to a step ST336. At the step ST336, the focus driving device 12 is started to move the focusing lens 8 toward the infinity-distance-end position. At a step ST337, changes taking place in the output of the absolute value encoder 14 following the movement of the focusing lens 8 are monitored. The step ST337 is repeated until the output of the absolute value encoder 14 comes to indicate "Z=FP_Z" (Z=3). After that, the flow proceeds from the step ST337 to a step ST338. At the step ST338, the value of the variable FP_CONT1 stored in the FP storing action at the time of moving the focusing lens 8 toward the infinity-distance-end position is stored into the counter CONT1. Then, the counter CONT1 is permitted to decrement its count value. The flow proceeds from the step ST338 to a step ST342.

If the detection zone value Z is found at the step ST335 to be "Z≦FP_Z", like in the case of FIG. 10(c), the flow proceeds from the step ST335 to a step ST339. At the step ST339, the focus driving device 12 is started to move the focusing lens 8 toward the nearest-distance-end position. At the next step ST340, changes of the output of the absolute value encoder 14 taking place following the movement of the focusing lens 8 are monitored. The step ST340 is repeated if the output of the absolute value encoder 14 does not show "Z=FP_Z". When the output of the absolute value encoder 14 comes to show "Z=FP_Z" (Z=3), the flow proceeds to a step ST341. At the step ST341, the value of the variable FP CONT2 stored in the FP storing action at the time of moving the focusing lens 8 toward the nearest-distance-end position is stored into the counter CONT1, and the counter CONT1 is permitted to increment its count value. The flow then proceeds from the step ST341 to the step ST342.

At the step ST342, changes of the count value of the counter CONT1 taking place following the movement of the focusing lens 8 are monitored. If the count value of the counter CONT1 is not zero, the step ST342 is repeated. When the count value of the counter CONT1 becomes zero (CONT1=0), the flow proceeds to a step ST343. At the step ST343, the focus driving device 12 is brought to a stop. The focusing lens position thus obtained must be "FP_Z=Z" if there is no abnormality. However, if the FP storing action is performed in the neighborhood of a point of change-over from one zone to another, for example, the positional relation between the output pulse of the absolute value encoder 14 and that of the relative value encoder 15 might come to deviate from a normal relation. In the event of such a deviation, some error gradually takes place through a series of reproducing actions.

A step ST344 is provided for solving this problem. At the step ST344, if the current detection zone value Z of the absolute value encoder 14 is found to be "Z≠FP_Z", the flow proceeds to a step ST345. At the step ST345, the stored value FP_Z of the position of the focusing lens 8 is updated to the current value of the absolute value encoder 14, and the flow of the reproducing operation comes to an end. If the current detection zone value Z is found at the step ST344 to be "Z=FP_Z", the flow of operation also comes to an end as there is no problem of having the above-stated error.

In brief, in a case where the focusing lens 8 is located in a zone which is the same as a zone at which the focusing lens position is stored by the FP storing action, the focusing lens 8 is temporarily moved to one end on the nearest-distance-end position side (the boundary between the zones Z3 and Z4) of the zone FP_Z stored in the FP storing action. After that, the focusing lens 8 is moved toward the infinity-distance-end position as much as the value of the variable FP_CONT1 stored in the FP storing action, and the movement of the focusing lens 8 is brought to a stop at the position (FP position) obtained at the time of point when the FP storing switch 18 has been operated.

Further, if the focusing lens 8 is located in a zone which differs from a zone at which the focusing lens position is stored in the FP storing action, the focusing lens 8 is moved toward the nearest-distance-end position shown in FIG. 10(*c*) as much as the value of the variable FP_CONT stored in the FP storing action, so that the focusing lens 8 is brought to the position (FP position) obtained at the point of time when the FP storing switch 18 has been operated.

The automatic focusing single-lens reflex camera having the focus preset function whereby the focusing lens 8 is movable in the direction of an optical axis by the focus driving mechanism 13 which is a cam member or the like and is interlocked with the manual operation member 16 is arranged as the third embodiment of the invention as described above. In the third embodiment, the position of the focusing lens 8 obtained at a point of time when the FP storing switch 18 has been operated in the FP storing action is stored as the zone information obtained from the absolute value encoder 14 and information on the numbers of output pulses of the relative value encoder 15 obtained by counting the pulses from both ends of the zone. In the focus preset (FP) position reproducing action, a trigger signal is obtained when the focusing lens 8 passes the end of the zone stored, and the focusing lens 8 is moved as much as the number of the output pulses of the relative value encoder 15 stored in the FP storing action. The arrangement enables the third embodiment to adequately carry out the focus preset function without recourse to use of a high-resolution and expensive absolute value encoder.

In the case of each embodiment disclosed above, the invention is applied to an automatic focusing single-lens reflex camera having the focus preset function. However, the invention is not limited to the cameras of this kind. The invention is applicable also to cameras of other kinds irrespective as to whether or not they are of the type using interchangeable lenses, to other optical apparatuses and also to the position control devices of cameras and other optical apparatuses.

Further, in the case of each of the embodiments disclosed, the absolute value encoder 14 is composed of a fixed Gray code pattern (not shown) and electric contacts (not shown) opposed to the Gray code pattern and is disposed at a part of a transmission mechanism of the focus driving mechanism 13. The relative value encoder 15 is composed of a fixed photo-interrupter (not shown) and a pulse plate (not shown) which is arranged to pass and block light between the light-emitting part and light-receiving part of the photo-interrupter. The relative value encoder 15 is also disposed at a part of the transmission mechanism of the focus driving mechanism 13. However, these encoders may be replaced with some other encoders as long as their functions are the same as those of the encoders in the embodiments disclosed.

While the embodiments are described above on the assumption that the moving member the position of which is to be controlled is a lens. However, the moving member does not have to be a lens but may be some other moving members. Further, the lens, i.e., a moving member, of each embodiment disclosed is arranged, by way of example, to be movable not only in one direction but also in the other direction (toward the nearest-distance end position and toward the infinity-distance end position). However, the moving member may be arranged to be moved only from one position toward the other position (with its initial position predetermined). In that case, changes of the focusing lens position resulting from the FP storing action may be arranged to be counted, for example, between the positions P0 and P1 shown in FIG. 10(*b*).

What is claimed is:

1. A position control device arranged to store, as a target position, a position at which a moving member is stopped and to move the moving member to the target position from a position other than the target position, said position control device comprising:

first detecting means which divides a movable range of the moving member into a plurality of areas and detects in which area of the plurality of areas the moving member is located;

second detecting means which detects an amount of movement of the moving member;

storage means which stores information specifying a target area in which the target position exists among the plurality of areas and indicating a position where the target position is located within the target area, wherein said information indicating the target position is information about the amount of movement between said target position and an area adjacent to said specified target area; and control means which controls, in moving the moving member to the target position from a position other than the target position, movement of the moving member on the basis of results of detection made by said first detecting means and said second detecting means and the information stored in said storage means.

2. A position control device according to claim 1, wherein, in moving the moving member to the target position from a position other than the target position, said control means causes said first detecting means to detect an area in which the moving member is located during movement, causes said second detecting means to detect an amount of movement of the moving member from an area adjacent to the target area, and causes the moving member to move up to the target position by comparing results of detection made by said first detecting means and said second detecting means with the information stored in said storage means.

3. A position control device according to claim 2, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means during a period of time for which the moving member moves from the target position to an area adjacent to the target area.

4. A position control device according to claim 1, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means during a period of time for which the moving member moves from the target position to an area adjacent to the target area.

5. A position control device according to claim 1, wherein said position control device is a device for controlling a position of a lens included in a lens apparatus.

6. A position control device according to claim 1, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means during a period of time for which the moving member moves from the target position to an area adjacent to the target area in a first direction and information corresponding to an amount of movement detected by said second detecting means during a period of time for which the moving member moves from the target position to an area adjacent to the target area in a direction opposite to the first direction.

7. A position control device according to claim 1, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means in controlling the movement of the moving member by moving the moving member from the target position to a particular position entering a predetermined amount an area adjacent to the target area in a first direction and then moving the moving member from the particular position to the target position.

8. A position control device arranged to store a target position for a moving member and to move the moving member to the target position from a position other than the target position, said position control device comprising:

first detecting means which divides a movable range of the moving member into a plurality of areas and detects in which area of the plurality of areas the moving member is located;

second detecting means which detects an amount of movement of the moving member;

storage means which store information specifying a target area in which the target position exists among the plurality of areas and indicating a position where the target position is located within the target area, wherein said information indicating the target position is information about the amount of movement between said target position and an area adjacent to said specified target area; and control means which controls, in moving the moving member to the target position from a position other than the target position, movement of the moving member on the basis of results of detection made by said first detecting means and said second detecting means and the information stored in said storage means.

9. A position control device according to claim 8, wherein, in moving the moving member to the target position from a position other than the target position, said control means causes said first detecting means to detect an area in which the moving member is located during movement, causes said second detecting means to detect an amount of movement of the moving member front an area adjacent to the target area, and causes the moving member to move up to the target position by comparing results of detection made by said first detecting means and said second detecting means with the information stored in said storage means.

10. A position control device according to claim 9, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means during a period of time for which the moving member moves from the target position to an area adjacent to the target area.

11. A position control device according to claim 8, further comprising a position storing control means which causes said storage means to store as the target area, an area detected by said first detecting means when the moving member is located at the target position, and to store, as the information indicating a position where the target position is located within the target area, information corresponding to an amount of movement detected by said second detecting means during a period of time for which the moving member moves from the target position to an area adjacent to the target area.

12. A position control device according to claim 8, wherein said position control device is a device for controlling a position of a lens included in a lens apparatus.

13. A position control device according to claim 8, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means during a period of time for which the moving member moves from the target position to an area adjacent to the target area in a first direction and information corresponding to an amount of movement detected by said second detecting means during a period of time for which the moving member moves from the target position to an area adjacent to the target area in a direction opposite to the first direction.

14. A position control device according to claim 8, further comprising a position storing control means which causes said storage means to store, as the target area, an area detected by said first detecting means when the moving member is located at the target position, and to store, as the information indicating a position where the target position is located within the target area, information corresponding to an amount of movement detected by said second detecting means in controlling the movement of the moving member by moving the moving member from the target position to a particular position entering a predetermined amount an area adjacent to the target area in a first direction and then moving the moving member from the particular position to the target position.

15. An optical apparatus comprising:
a lens movable in an optical axis direction;
first lens driving means arranged to be mechanically interlocked with a manual operation member to drive said lens;
second lens driving means for electrically driving said lens by a driving device;
first lens position detecting means for detecting a position of said lens in terms of absolute position;
second lens position detecting means for detecting a position of said lens in terms of relative position at a finer rate of resolution than said first lens position detecting means;
lens position storing means for storing a position of said lens obtained when said lens is at an arbitrary position, on the basis of information on results of detection made by said first lens position detecting means and said second lens position detecting means; and
lens position reproducing means for causing said second lens driving means to move said lens to the position stored by said lens position storing means.

16. An optical apparatus according to claim 15, wherein said lens position storing means stores, as the position of said lens, a first detection value obtained by said first lens position detecting means when said lens is at the arbitrary position and a relative amount detected by said second lens position detecting means until a detection value by said first lens position detecting means changes from the first detection value according to the movement of said lens from the arbitrary position.

17. A position control device comprising:
driving means which moves a moving member;
first detecting means which divides a movable range of the moving member into a plurality of areas and detects an area in which the moving member is located among the plurality of areas;
second detecting means which detects an amount of movement of the moving member according to a moving direction in which the moving member is moved;

position control means which controls movement of the moving member by using said driving means and stores in storage means information about a set position at which the moving member is located based on a detection value obtained by said first detecting means and said second detecting means when said moving member is moved; and position reproducing means for moving said moving member to said set position using said driving means, based on said set position information stored in said storage means, wherein said set position information includes information of an area in which said moving member detected by said first detecting means is located, and information about the amount of movement detected by said second detecting means between an adjacent area to said area in which said moving member is located and said set position.

18. A position control device arranged to store, as a target position, a position at which a moving member is stopped and to move the moving member to the target position from a position other than the target position, said position control device comprising:
a first detector which divides a movable range of the moving member into a plurality of areas and detects in which area of the plurality of areas the moving member is located;
a second detector which detects an amount of movement of the moving member; and
a microcomputer, wherein said microcomputer:
stores information to specify a target area in which the target position exists among the plurality of areas and to indicate a position where the target position is located within the target area, wherein said stored information indicating the target position is information about the amount of movement between said target position and an area adjacent to said specified target area, and
controls, while moving the moving member to the target position from a position other than the target position, movement of the moving member on the basis of results of detection made by said first detector, said second detector and said stored information.

19. A position control device arranged to store a target position for a moving member and to move the moving member to the target position from a position other than the target position, said position control device comprising:
a first detector which divides a movable range of the moving member into a plurality of areas and detects in which area of the plurality of areas the moving member is located;
a second detector which detects an amount of movement of the moving member; and
a microcomputer, wherein said microcomputer:
stores information to specify a target area in which the target position exists among the plurality of areas and to indicate a position where the target position is located within the target area, wherein said stored information indicating the target position is information about the amount of movement between said target position and an area adjacent to said specified target area, and
controls, while moving the moving member to the target position from a position other than the target position, movement of the moving member on the basis of results of detection made by said first detector, said second detector and said stored information.

20. An optical apparatus comprising:

a lens movable in an optical axis direction;

first lens driving means arranged to be mechanically interlocked with a manual operation member to drive said lens;

second lens driving means for electrically driving said lens by a driving device;

first lens position detecting means for detecting a position of said lens in terms of absolute position;

second lens position detecting means for detecting a position of said lens in terms of relative position at a finer rate of resolution than said first lens position detecting means; and a microcomputer, wherein said microcomputer:

stores a position of said lens obtained when said first lens is at an arbitrary position, on the basis of information on results of detection made by said lens position detecting means and said second lens position detecting means, and causes said second lens driving means to move said lens to the position stored by said lens microcomputer.

* * * * *

UNITED STATES PATENT AND TRADEMARK OFFICE
CERTIFICATE OF CORRECTION

PATENT NO.     : 6,570,142 B1
DATED          : May 27, 2003
INVENTOR(S)    : Akihiro Kawanami et al.

It is certified that error appears in the above-identified patent and that said Letters Patent is hereby corrected as shown below:

Column 17,
Line 9, delete "FP CONT2" and insert -- FP_CONT2 --.

Column 20,
Line 38, delete "front" and insert -- from --.

Signed and Sealed this

Seventh Day of October, 2003

JAMES E. ROGAN
*Director of the United States Patent and Trademark Office*